(12) United States Patent
Shimizu et al.

(10) Patent No.: US 10,884,330 B2
(45) Date of Patent: Jan. 5, 2021

(54) LIGHT SOURCE APPARATUS AND PROJECTOR

(71) Applicant: SEIKO EPSON CORPORATION, Tokyo (JP)

(72) Inventors: Tetsuo Shimizu, Matsumoto (JP); Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/547,698

(22) Filed: Aug. 22, 2019

(65) Prior Publication Data

US 2020/0064721 A1 Feb. 27, 2020

(30) Foreign Application Priority Data

Aug. 23, 2018 (JP) ................. 2018-156571

(51) Int. Cl.
*G03B 21/14* (2006.01)
*G03B 21/20* (2006.01)
*H04N 9/31* (2006.01)

(52) U.S. Cl.
CPC ......... *G03B 21/204* (2013.01); *H04N 9/3141* (2013.01)

(58) Field of Classification Search
CPC .... G03B 21/006; G03B 21/008; G03B 21/28; G03B 21/145; G03B 21/208; F21K 9/62; F21K 9/64; F21K 9/65; F21K 9/66; F21K 9/69
See application file for complete search history.

(56) References Cited

U.S. PATENT DOCUMENTS

| 2003/0076862 A1* | 4/2003 | Itoh ................... G11B 7/22 372/36 |
| 2006/0291246 A1 | 12/2006 | Hattori et al. |
| 2009/0152579 A1* | 6/2009 | Udagawa ............ H01L 33/0079 257/98 |
| 2013/0329397 A1 | 12/2013 | Shimizu et al. |
| 2015/0009703 A1 | 1/2015 | Morizumi et al. |

(Continued)

FOREIGN PATENT DOCUMENTS

| JP | 2007-005483 A | 1/2007 |
| JP | 2009-294300 A | 12/2009 |

(Continued)

*Primary Examiner* — Sultan Chowdhury
(74) *Attorney, Agent, or Firm* — Oliff PLC

(57) ABSTRACT

A light source apparatus according to an aspect of the present disclosure includes a substrate having a first surface, a frame, a lid with which the frame is provided, a light emitter that is accommodated in an accommodation space, a wavelength converter that is provided at the substrate, is accommodated in the accommodation space, converts first light emitted from the light emitter into second light having a wavelength different from the wavelength of the first light, and outputs the second light, and a first optical film that is provided in the light path between the light emitter and the wavelength converter, transmits one of the first light and the second light, and reflects the other one of the first light and the second light, and the light emitter emits the first light in such a way that the chief ray of the first light travels along the first surface.

18 Claims, 9 Drawing Sheets

(56) References Cited

U.S. PATENT DOCUMENTS

| | | | |
|---|---|---|---|
| 2015/0219288 A1* | 8/2015 | An | H01L 33/44 362/293 |
| 2017/0122505 A1 | 5/2017 | Kiyota et al. | |
| 2017/0277026 A1* | 9/2017 | Ikeo | G02B 26/0833 |
| 2018/0087726 A1 | 3/2018 | Yamashita | |
| 2018/0217480 A1 | 8/2018 | Ito | |
| 2018/0239232 A1* | 8/2018 | Yasumatsu | G03B 21/208 |

FOREIGN PATENT DOCUMENTS

| | | |
|---|---|---|
| JP | 2010-087324 A | 4/2010 |
| JP | 2012-054272 A | 3/2012 |
| JP | 2013-254889 A | 12/2013 |
| JP | 2015-029034 A | 2/2015 |
| JP | 2017-085036 A | 5/2017 |
| JP | 2018-056160 A | 4/2018 |
| JP | 2018-124444 A | 8/2018 |

\* cited by examiner

LIGHT SOURCE APPARATUS AND PROJECTOR

The present application is based on, and claims priority from JP Application Serial Number 2018-156571, filed Aug. 23, 2018, the disclosure of which is hereby incorporated by reference herein in its entirety

BACKGROUND

1. Technical Field

The present disclosure relates to a light source apparatus and a projector.

2. Related Art

JP-A-2018-56160 discloses a light source apparatus that uses, as illumination light, fluorescence generated by a phosphor irradiated with laser light as excitation light. The light source apparatus has a structure in which a semiconductor laser device and a phosphor are accommodated in a space defined by a base and a cap.

However, the light source apparatus described above, in which heat of the phosphor is discharged based on the structure in which the phosphor is in contact with a transmissive member, has a problem of a difficulty in sufficiently dissipating the heat from the phosphor.

SUMMARY

A light source apparatus according to an aspect of the present disclosure includes a substrate having a first surface, a frame provided at a side facing the first surface, a lid with which the frame is provided, a light emitter that is accommodated in an accommodation space formed by the substrate, the frame, and the lid and provided at the side facing the first surface of the substrate, a wavelength converter that is provided at the substrate, is accommodated in the accommodation space, converts first light emitted from the light emitter into second light having a wavelength different from a wavelength of the first light, and outputs the second light, and a first optical film that is provided in a light path between the light emitter and the wavelength converter, transmits one of the first light and the second light, and reflects another one of the first light and the second light, and the light emitter emits the first light in such a way that a chief ray of the first light travels along the first surface.

In the light source apparatus according to the aspect of the present disclosure, the substrate may have an inclining surface that inclines toward the lid with respect to the first surface with distance along a traveling direction of the first light, and the wavelength converter may be provided at the inclining surface.

The light source apparatus according to the aspect of the present disclosure may further include an optical element that is provided in the light path between the light emitter and the wavelength converter and has a second surface, and the first optical film may be formed at the second surface of the optical element, transmit the first light emitted from the light emitter, and reflect the second light outputted from the wavelength converter.

In this case, a parallelizing element that parallelizes the second light may be integrated with the optical element.

The light source apparatus according to the aspect of the present disclosure may further include an optical element that is provided in the light path between the light emitter and the wavelength converter and has a second surface, and the first optical film may be formed at the second surface of the optical element, reflect the first light emitted from the light emitter, and transmit the second light outputted from the wavelength converter.

In this case, the light source apparatus may further include a first low-refractive-index layer that is provided between the wavelength converter and the optical element and has a refractive index smaller than refractive indices of the wavelength converter and the optical element.

The light source apparatus according to the aspect of the present disclosure may further include a second optical element that is so disposed on a surface of the lid that is a surface opposite the wavelength converter as to face the wavelength converter via a second low-refractive-index layer having a refractive index smaller than a refractive index of the lid, and the second optical element may reduce a radiation angle of the second light outputted from the wavelength converter.

In the light source apparatus according to the aspect of the present disclosure, the optical element may be provided in a region through which the first light and the second light pass.

A projector according to another aspect of the present disclosure includes the light source apparatus according to the aspect of the present disclosure, a light modulator that modulates light outputted from the light source apparatus in accordance with image information, and a projection optical apparatus that projects the light modulated by the light modulator.

DESCRIPTION OF EXEMPLARY EMBODIMENTS

First Embodiment

Embodiments of the present disclosure will be described below in detail with reference to the drawings.

The following embodiments will each be described with reference to a light source apparatus preferably used in a projector that will be described later.

In the following entire drawings, components are drawn at different dimensional scales in some cases for clarity of each of the components.

Figure 1:
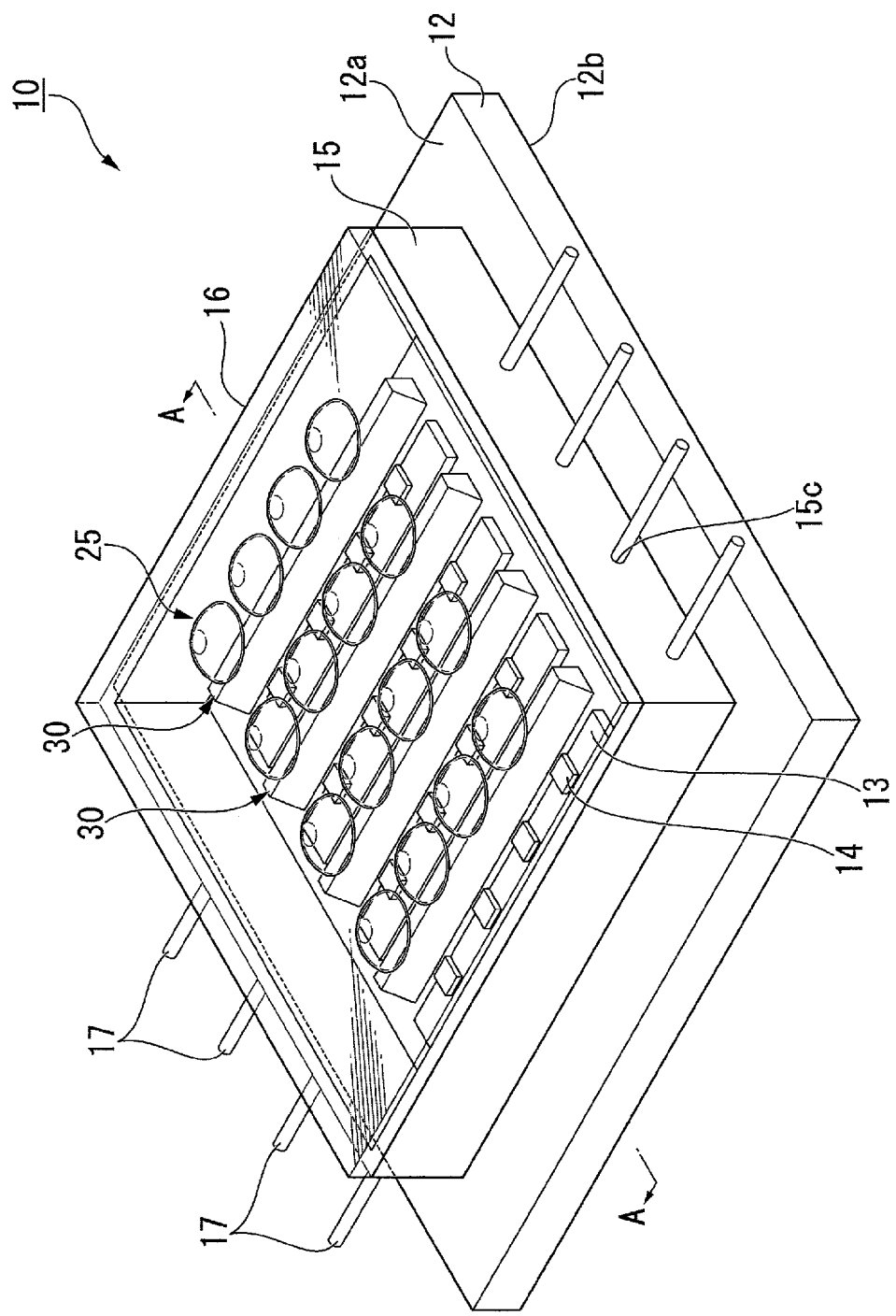
FIG. 1 is a perspective view of a light source apparatus according to a first embodiment.

FIG. 1 is a perspective view of a light source apparatus according to a first embodiment.

Figure 2:
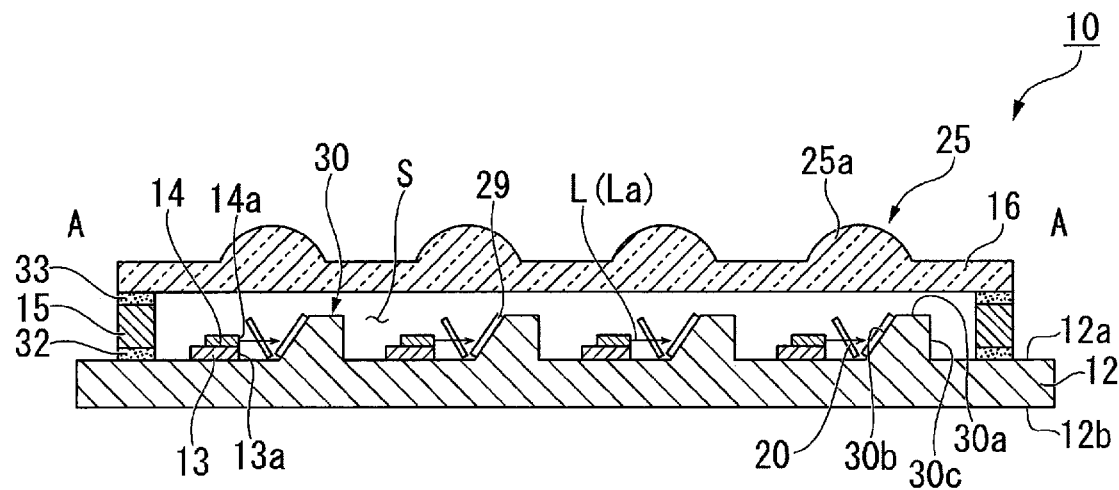
FIG. 2 is a cross-sectional view of the light source apparatus taken along the line A-A in FIG. 1.

FIG. 2 is a cross-sectional view of the light source apparatus taken along the line A-A in FIG. 1.

A light source apparatus 10 according to the first embodiment includes a substrate 12, a plurality of sub-mounts 13, a plurality of light emitters 14, a frame 15, a lid 16, a plurality of lead terminals 17, a plurality of wavelength converters 29 (see FIG. 2), and a plurality of wavelength selectors 20 (see FIG. 2), as shown in FIG. 1. The substrate 12, the frame 15, and the lid 16 are members separate from one another and are bonded to each other in the form to be described later.

The substrate 12 is formed of a plate having a front surface 12a (first surface) and a rear surface 12b opposite the front surface 12a. The substrate 12 has a substantially square shape, a substantially oblong shape, or any other quadrangular shape in a plan view viewed along the direction of a normal to the front surface 12a. The plurality of light emitters 14 are provided at the side facing the front surface 12a of the substrate 12 via the plurality of sub-mounts 13, which will be described later. In the following description, the term simply written as a "plan view" means a plan view viewed along the direction of a normal to the front surface 12a of the substrate 12.

A heat dissipating member (not shown), such as a heat sink, is provided as appropriate on the rear surface 12b of the substrate 12. To this end, the substrate 12 is made of a metal material having high thermal conductivity. As a metal material of this type, copper, aluminum, and other metals are preferably used, and copper is particularly preferably used.

The plurality of sub-mounts 13 are provided at the front surface 12a of the substrate 12 at predetermined intervals in the direction parallel to one edge of the substrate 12, as shown in FIG. 1. The plurality of sub-mounts 13 are provided in correspondence with the plurality of light emitters 14. In the first embodiment, the sub-mounts 13 are each so provided as to be common to four light emitters 14, but the number of light emitters 14 common to one sub-mount 13 is not limited to a specific number. The sub-mounts 13 may instead be provided in correspondence with the plurality of light emitters 14 in the one-to-one relationship. That is, one sub-mount 13 may be provided in correspondence with one light emitter 14.

The sub-mounts 13 are made, for example, of a ceramic material, such as aluminum nitride and alumina. The sub-mounts 13 are interposed between the substrate 12 and the light emitters 14 and reduce thermal stress induced by the difference in coefficient of linear expansion between the substrate 12 and the light emitters 14. The sub-mounts 13 are bonded to the substrate 12 via a bonding material, such as a silver brazing material and gold-tin solder.

The plurality of light emitters 14 are provided at the side facing the front surface 12a of the substrate 12. The light emitters 14 are each formed, for example, of a solid-state light source, such as a semiconductor laser and a light emitting diode. The light emitters 14 may each be a light emitter that emits light having an arbitrary wavelength in accordance with the application of the light source apparatus 10. In the first embodiment, as the light emitters 14 that emit blue light having a wavelength ranging from 430 to 490 nm for excitation of a phosphor, an edge-emitting semiconductor laser made, for example, of a nitride-based semiconductor ($In_XAl_YGa_{1-X-Y}N$, $0 \leq X \leq 1$, $0 \leq Y \leq 1$, $X+Y \leq 1$) is used. In addition to the general chemical formula described above, for example, part of the Group-III element may be replaced with boron atoms, or part of the nitrogen atoms may be replaced with phosphorus or arsenic atoms as the Group-V element.

The plurality of light emitters 14 are so configured, for example, that (m×n) semiconductor lasers (m, n: natural number greater than or equal to 2) are arranged in a lattice having m rows and n columns in the plan view, as shown in FIG. 1. In the first embodiment, as the plurality of light emitters 14, for example, 16 semiconductor lasers are arranged in a lattice having four rows and four columns.

The light emitters 14 are so provided on the sub-mounts 13 that a light exiting surface 14a, out of the six surfaces of each of the light emitters 14, which each have a box-like shape, is perpendicular to the front surface 12a of the substrate 12, as shown in FIG. 2. In the first embodiment, the light emitters 14 are placed on the front surface 12a of the substrate 12 via the sub-mounts 13.

The plurality of light emitters 14 each have the light exiting surface 14a, via which excitation light L (first light) exits. The plurality of thus disposed light emitters 14 each emit the excitation light L in the direction along the front surface 12a of the substrate 12. That is, a chief ray La of the excitation light L emitted from each of the plurality of light emitters 14 travels along the front surface 12a.

The light emitters 14 are each so provided on the corresponding sub-mount 13 that the light exiting surface 14a is substantially flush with one end surface 13a of sub-mount 13. The light emitters 14 are bonded to the sub-mounts 13 via a bonding material (not shown), such as a silver brazing material and gold-tin solder.

In the first embodiment, the plurality of wavelength converters 29, which are disposed in correspondence with the light emitters 14, are provided on the substrate 12. The excitation light L emitted from each of the plurality of light emitters 14 enters on the corresponding wavelength converter 29. That is, the number of provided wavelength converters 29 is equal to the number of light emitters 14 (16 in first embodiment). One wavelength converter 29 may be provided for a plurality of the light emitters 14.

The substrate 12 includes a plurality of supports 30. The plurality of supports 30 are provided at the side facing the front surface 12a of the substrate 12 at predetermined intervals in the direction parallel to one edge of the substrate 12, as shown in FIGS. 1 and 2. The plurality of supports 30 are disposed between the plurality of sub-mounts 13 arranged on the front surface 12a.

The plurality of supports 30 are provided in correspondence with the plurality of wavelength converters 29. In the first embodiment, one support 30 is so provided as to be common to four light emitters 14. Four wavelength converters 29 are therefore provided for one support 30. One wavelength converter 29 may instead be provided for one support 30.

The supports 30 are integrated with the substrate 12. The supports 30 each have an upper surface 30a, which is so provided as to protrude from the front surface 12a toward the lid 16 and is parallel to the front surface 12a, a first side surface 30b, which connects the front surface 12a to an end of the upper surface 30a that is the end on which the excitation light L is incident, and a second side surface 30c, which connects the front surface 12a to an end of the upper surface 30a that is the end opposite the end on which the excitation light L is incident, as shown in FIG. 2. The first side surface 30b is an inclining surface that inclines toward the lid 16 with respect to the front surface 12a with distance along the traveling direction of the excitation light L. The second side surface 30c is, for example, a surface perpendicular to the front surface 12a, but not necessarily, and can be changed as appropriate. In the first embodiment, the supports 30 and the substrate 12 are integrated with each other, and the supports 30 may instead be formed as portions separate from the substrate 12.

The wavelength converters 29 are provided on the first side surfaces 30b (inclining surfaces) of the supports 30. The wavelength converters 29 each convert the excitation light L incident from the corresponding light emitter 14 into fluorescence YL (second light) and output the fluorescence YL. Since the wavelength converters 29 are disposed in the paths along which the excitation light L travels, the excitation light is efficiently guided to the wavelength converters 29 without being refracted or reflected.

Figure 3:
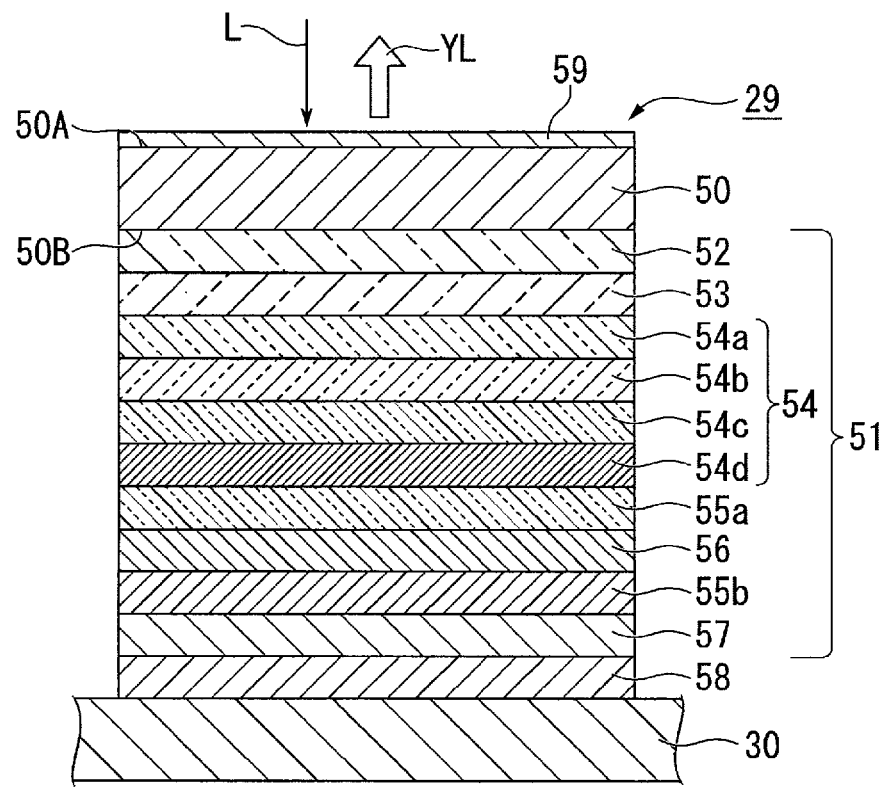
FIG. 3 is a cross-sectional view showing the configuration of key parts of a wavelength converter in the first embodiment.

FIG. 3 is a cross-sectional view showing the configuration of key parts of each of the wavelength converters 29 in the first embodiment. The wavelength converters 29 each include a phosphor layer 50 and a reflection member 51, as shown in FIG. 3.

The phosphor layer 50 has an upper surface 50A, on which the excitation light L is incident and via which the fluorescence YL exits, and a bottom surface 50B, which is opposite the upper surface 50A, that is, on which the reflection member 51 is provided. The bottom surface 50B faces the first side surface 30b of the corresponding support 30. In the first embodiment, an antireflection film 59 is provided on the upper surface 50A of the phosphor layer 50. The excitation light L therefore efficiently enters the phosphor layer 50.

In the first embodiment, the phosphor layer 50 is a ceramic phosphor formed by firing phosphor particles. A YAG (yttrium aluminum garnet) phosphor containing Ce ions is used as the phosphor particles that form the phosphor layer 50.

The phosphor particles may be made of one material or a mixture of particles made of two or more materials. The phosphor layer 50 is preferably, for example, a phosphor layer in which phosphor particles are dispersed in an inorganic binder, such as alumina, or a phosphor layer formed by firing a glass binder, which is an inorganic material, and phosphor particles. The phosphor layer may instead be formed by firing phosphor particles with use of no binder.

The reflection member 51 is provided at the side facing the bottom surface 50B of the phosphor layer 50. The wavelength converters 29 are each bonded to the first side surface 30b of the corresponding support 30 via a bonding material 58. The bonding material 58 is, for example, nano-silver paste. The bonding material 58 may instead, for example, be a metal brazing material for metal bonding.

In the first embodiment, the reflection member 51 is formed of a multilayer film that is a laminate of a plurality of films. The reflection member 51 in the first embodiment is formed of the following layers laminated on each other sequentially from the side facing the bottom surface 50B of the phosphor layer 50: a sealing layer 52; a total reflection layer 53; a multilayer film 54; a first protection layer 55a; a reflection layer 56; a second protection layer 55b; and a bonding auxiliary layer 57.

The sealing layer 52 is made, for example, of $SiO_2$ having a film thickness of 350 nm. The total reflection layer 53 is formed, for example, of an $SiO_2$ layer having a film thickness of 100 nm and totally reflects, out of the fluorescence YL generated in the phosphor layer 50, light incident at an angle greater than or equal to the critical angle. The multilayer film 54 is formed of a first reflection layer 54a, a second reflection layer 54b, a third reflection layer 54c, and a fourth reflection layer 54d sequentially laminated on each other.

The first reflection layer 54a is formed, for example, of an $Nb_2O_5$ layer having a film thickness ranging from 30 to 40 nm. The second reflection layer 54b is formed of an $SiO_2$ layer having a film thickness ranging from 90 to 100 nm. The third reflection layer 54c is formed of an $Nb_2O_5$ layer having a film thickness ranging from 50 to 60 nm. The fourth reflection layer 54d is formed of an $Al_2O_3$ layer having a film thickness ranging from 50 to 60 nm.

In the first embodiment, the first protection layer 55a and the second protection layer 55b are each a layer containing a metal. The first protection layer 55a and the second protection layer 55b are intended to suppress degradation of the reflection layer 56.

In the first embodiment, the first protection layer 55a and the second protection layer 55b each contain, as an oxide-based electrically conductive material or an amorphous electrically conductive oxide, at least one metal selected, for example, from indium tin oxide (ITO), fluorine-doped tin oxide ($SnO_2$:F) (FTO), antimony doped tin oxide ($SnO_2$:Sb) (ATO), aluminum-doped zinc oxide (ZnO:Al) (AZO), gallium-doped zinc oxide (ZnO:Ga) (GZO), indium-doped zinc oxide (IZO), gallium-doped indium oxide (IGO), zinc oxide (ZnO), and tin oxide ($SnO_2$).

In the first embodiment, the first protection layer 55a and the second protection layer 55b are each made of tin oxide ($SnO_2$). The first protection layer 55a and the second protection layer 55b may be made of materials different from each other.

In the first embodiment, since the tin oxide ($SnO_2$) film is provided at the light incident side and the light exiting side of the reflection layer 56, migration of Ag atoms is unlikely to occur, whereby occurrence of agglomeration due to the migration is suppressed.

The bonding auxiliary layer 57 bonds the reflection member 51 to the corresponding support 30. Using, for example, an Ag layer as the bonding auxiliary layer 57 allows improvement in thermal conductivity between the reflection member 51 and the support 30.

The plurality of wavelength selectors 20 are provided in correspondence with the plurality of wavelength converters 29, as shown in FIG. 2. That is, the number of provided wavelength selectors 20 is equal to the number of wavelength converters 29 (16 in first embodiment), as shown in FIG. 2. The wavelength selectors 20 are provided in the optical paths of the excitation light L between the light emitters 14 and the wavelength converters.

Figure 4:
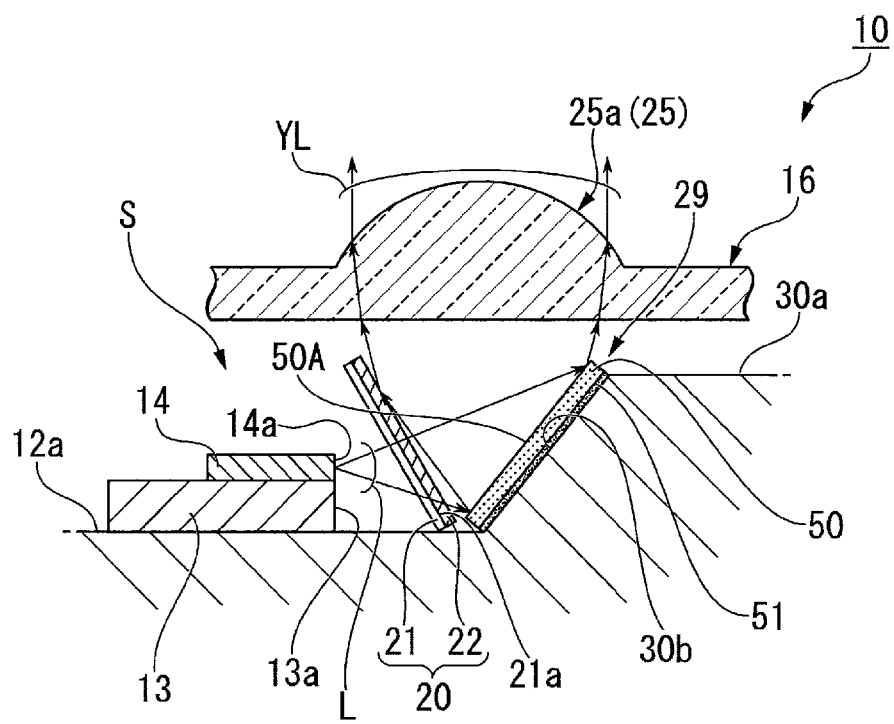
FIG. 4 is an enlarged view of the configuration of one of light emitters and therearound.

FIG. 4 is an enlarged view of the configuration of one of the light emitters and thereabove.

The wavelength selectors 20 each include a transmissive substrate 21 (optical element) and a dichroic film 22 (first optical film), as shown in FIG. 4. In the first embodiment, the dichroic film 22 is provided, for example, on a second surface 21a of the transmissive substrate 21, which is the surface facing the corresponding wavelength converter 29. The dichroic film 22 may instead be provided on a surface of the transmissive substrate 21 that is the surface opposite the second surface 21a (surface of transmissive substrate 21 that is surface facing light emitter 14 or light exiting surface 14a).

The transmissive substrate 21 is a substrate for holding the dichroic film 22. The dichroic film 22 is formed of an optical film optically characterized in that it transmits the excitation light L and reflects the fluorescence YL. The wavelength selectors 20 may each be so provided as to be common to the four wavelength converters 29 supported by one support 30.

The thus configured wavelength selectors 20 can transmit the excitation light L and reflect the fluorescence YL outputted from the wavelength converters 29.

The wavelength selectors 20 are so disposed as to reflect the fluorescence YL emitted from the phosphor layers 50 of the wavelength converters 29 in a predetermined direction. For example, the wavelength selectors 20 are so supported by regions that are not shown (regions extending in depth direction with respect to plane of view, for example) as to be maintained in a predetermined attitude. The wavelength selectors 20 are each so provided that the second surface 21a extends along the direction parallel to one edge of the substrate 12. The frame 15 holds ends of each of the wavelength selectors 20 that are the ends in the depth direction described above. The wavelength selectors 20 are each further so provided that the second surface 21a extends in the direction in which the corresponding lead terminal 17, which will be described later, extends. The frame 15 holds ends of each of the wavelength selectors 20 that are the ends in the extending direction described above. The wavelength selectors 20 are each further so provided that the second surface 21a extends in the direction in which the corresponding support 30 extends. The frame 15 holds ends of each of the wavelength selectors 20 that are the ends in the extending direction described above.

The frame 15 is so provided as to surround the plurality of light emitters 14 and the plurality of wavelength converters 29 and is bonded to the front surface 12a of the substrate 12. The frame 15 is therefore so provided as to protrude toward the front surface 12a of the substrate 12. The frame 15 has an annularly quadrangular shape in the plan view. The quadrangular frame 15 may be so configured that the four edges thereof are integrated with each other into a unitary member, or a plurality of members may be bonded to each other into the frame 15. The frame 15 maintains a fixed distance (gap) between the substrate 12 and the lid 16 and forms part of an accommodation space S, which accommodates the plurality of light emitters 14. To this end, the frame 15 preferably has predetermined rigidity.

The frame 15 serves to reduce stress induced in the lid 16. To this end, the frame 15 is preferably made of a material having a coefficient of linear expansion smaller than the coefficient of linear expansion of the substrate 12 but greater than the coefficient of linear expansion of the lid 16. The frame 15 is preferably made, for example, of a Kovar or any other metal material, alumina, silicon carbide, silicon nitride, or any other ceramic material, particularly preferably Kovar or alumina.

The lid 16 is formed of a transmissive member that transmits the fluorescence YL outputted from the plurality of wavelength converters 29. The lid 16 is so provided as to face the front surface 12a of the substrate 12 and is bonded to a side of the frame 15 that is the side opposite the substrate 12. In the plan view, the lid 16 has a quadrangular shape, including a square shape and an oblong shape.

The lid 16 is bonded to the frame 15 via a bonding material 33, such as an organic adhesive, a metal bonding material, and an inorganic bonding material. The organic adhesive is preferably, for example, a silicone-based adhesive, an epoxy-based adhesive, and acrylic adhesive. The metal boning material is preferably, for example, a silver brazing material and gold-tin solder. The inorganic bonding material is preferably, for example, low-melting-point glass.

The transmissive member that forms the lid 16 is a plate-shaped member made of a light transmissive material. Examples of the material of which the lid 16 is made may include borosilicate glass, quartz glass, synthetic quartz glass, or any other type of glass, crystal quartz, and sapphire.

The lid 16 in the first embodiment has refractive power. Specifically, in the first embodiment, a collimation lens unit 25 is integrated with a surface of the lid 16 that is the surface opposite the substrate 12. The collimation lens unit 25 includes a plurality of lenses 25a disposed in correspondence with the wavelength converters 29. That is, the number of lenses 25a provided in the collimation lens unit 25 is equal to the number of wavelength converters 29 (16 in first embodiment). The lenses 25a are each formed of a planoconvex lens.

The lenses 25a (parallelizing elements) of the collimation lens unit 25 parallelize the fluorescence YL outputted from the wavelength converters 29 and the fluorescence YL outputted from the wavelength converters 29 and reflected off the wavelength selectors 20.

In the light source apparatus 10 according to the first embodiment, the excitation light L emitted from the light emitters 14 travels along the front surface 12a of the substrate 12 and enters the wavelength selectors 20. The excitation light L passes through the wavelength selectors 20 and enters the wavelength converters 29. In each of the wavelength converters 29, the phosphor layer 50 is excited with the excitation light L and emits the fluorescence YL. In the first embodiment, an antireflection film (not shown) is provided on the upper surface 50A of the phosphor layer 50. The excitation light L is therefore not reflected off the upper surface 50A of the phosphor layer 50 but efficiently enters the phosphor layer 50.

The phosphor layer 50 emits the fluorescence YL via the upper surface 50A, as shown in FIG. 4. The fluorescence YL having exited via the upper surface 50A radially spreads. Part of the fluorescence YL enters the corresponding wavelength selector 20. The fluorescence YL is reflected off the dichroic film 22 of the wavelength selector 20, enters the corresponding lens 25a of the collimation lens unit 25 integrated with the lid 16, and is parallelized by the lens 25a. The remainder of the fluorescence YL directly enters the lens 25a and is parallelized by the lens 25a. The wavelength selector 20 thus separates the fluorescence YL having exited via the upper surface 50A of the phosphor layer 50 from the optical path of the excitation light L, whereby the fluorescence YL efficiently exits out of the light source apparatus 10 via the lens 25a.

The temperature of the light emitters 14 increases when they emit the excitation light L. In the light source apparatus 10 according to the first embodiment, in which the light emitters 14 are placed on the front surface 12a of the substrate 12, heat generated by the light emitters 14 when they emit the excitation light L is efficiently transmitted to the substrate 12. The light source apparatus 10 thus efficiently discharges the heat from the light emitters 14, whereby damage on the light source apparatus 10 due to the heat from the light emitters 14 can be reduced.

Further, in each of the wavelength converters 29, the temperature of the phosphor layer 50 increases when it emits the fluorescence YL. In the light source apparatus 10 according to the first embodiment, in which the wavelength converters 29 are supported by the supports 30 integrated with the front surface 12a of the substrate 12, the heat radiated from the phosphor layers 50 of the wavelength converters 29 when the phosphor layers 50 emit the fluorescence YL is efficiently transmitted to the substrate 12 via the supports 30. The light source apparatus 10 thus efficiently discharges the heat from the phosphor layers 50, whereby damage on the light source apparatus 10 due to the heat from the phosphor layers 50 can be reduced.

Referring back to FIGS. 1 and 2, the substrate 12 and the frame 15 are bonded to each other via a bonding material 32, such as an organic adhesive, a metal bonding material, and an inorganic bonding material. The organic adhesive is preferably, for example, a silicone-based adhesive, an epoxy-based adhesive, and acrylic adhesive. The metal boning material is preferably, for example, a silver brazing material and gold-tin solder. The inorganic bonding material is preferably, for example, low-melting-point glass.

Since the substrate 12, the frame 15, and the lid 16 are bonded to each other as described above, the space surrounded by the substrate 12, the frame 15, and the lid 16 is isolated form the atmosphere and forms a tightly closed space for accommodating the plurality of light emitters 14 in an airtight manner. The tightly closed space is hereinafter referred to as an accommodation space S. That is, in the first embodiment, the plurality of light emitters 14 and the plurality of wavelength converters 29 are accommodated in the accommodation space S formed by the substrate 12, the frame 15, and the lid 16.

Since the plurality of light emitters 14 are accommodated in the accommodation space S, adhesion of foreign matter, such as organic substances and moisture, to the light emitters 14 is suppressed. The accommodation space S is preferably maintained in a decompressed state. The accommodation space S may instead be filled with an inert gas, such as a nitrogen gas, or dried air. The decompressed state refers to a state of a space filled with a gas having pressure lower than the atmospheric pressure. In decompressed state, the gas with which the accommodation space S is filled is preferably an inert gas or dried air.

The frame 15 is provided with a plurality of through holes 15c, as shown in FIG. 1. The lead terminals 17 for supplying the plurality of light emitters 14 with electric power are so provided as to pass through the plurality of through holes 15c. The lead terminals 17 are made, for example, of Kovar. A plated layer made, for example, of nickel-gold is provided on the surface of each of the lead terminals 17.

FIG. 1 shows a case where the plurality of light emitters 14 mounted on one sub-mount 13 are connected in series to each other and a pair of lead terminals 17 are provided at opposite sides of the sub-mount 13. The electrical connection of the plurality of light emitters 14 to an external circuit and the arrangement of the lead terminals 17 are not limited to those in the example shown in FIG. 1 and can be changed as appropriate.

Bonding wires (not shown) that electrically connect one-side ends of the lead terminals 17 to terminals of the light emitters 14 are provided in the accommodation space S. The other-side ends of the lead terminals 17 are connected to an external circuit (nots shown). A sealing material seals the gap between the inner wall of each of the through holes 15c of the frame 15 and the corresponding lead terminal 17. The sealing material is preferably, for example, low-melting-point glass.

The light source apparatus 10 according to the first embodiment described above provides the following effects.

The light source apparatus 10 according to the first embodiment includes the substrate 12, which has the front surface 12a, the frame 15, which is so provided as to protrude toward the front surface 12a, the lid 16, which is provided on the frame 15, the light emitters 14, which are accommodated in the accommodation space S formed by the substrate 12, the frame 15, and the lid 16, are placed on the front surface 12a, and emit the excitation light L having the chief ray La traveling along the front surface 12a, the wavelength converters 29, which are provided on the substrate 12 and therefore accommodated in the accommodation space S, convert the excitation light L into the fluorescence YL, and output the fluorescence YL, and the dichroic films 22, which are provided in the optical paths between the light emitters 14 and the wavelength converters 29, transmit the excitation light L, and reflect the fluorescence YL.

In the thus configured light source apparatus 10 according to the first embodiment, the plurality of light emitters 14 and the plurality of wavelength converters 29 are accommodated in the accommodation space S, whereby the size of the light source apparatus itself can be reduced. Further, since the light emitters 14 and the wavelength converters 29 are provided on the substrate 12, the heat dissipation performance of the light emitters 14 and the wavelength converters 29 can be improved. Moreover, since the dichroic films 22 are provided in the optical paths between the light emitters 14 and the wavelength converters 29, the fluorescence YL emitted from the phosphor layers 50 can be separated from the optical paths of the excitation light L and efficiently exit out of the light source apparatus 10. The light source apparatus 10 according to the first embodiment therefore excels in heat dissipation performance of the wavelength converters 29, is compact, and can efficiently use the fluorescence YL.

The light source apparatus 10 according to the first embodiment further includes the transmissive substrates 21 provided in the optical paths between the light emitters 14 and the wavelength converters 29 and each having the second surface 21a, and the dichroic films 22 are formed on the second surfaces 21a of the transmissive substrates 21, transmit the excitation light L emitted from the light emitters 14, and reflect the fluorescence YL outputted from the wavelength converters 29.

According to the configuration described above, in which the transmissive substrates 21 support the dichroic films 22, the dichroic films 22 can be satisfactorily disposed in the optical paths between the light emitters 14 and the wavelength converters 29. The dichroic films 22 can therefore reflect the fluorescence YL in a predetermined direction, whereby the fluorescence YL can be extracted at improved efficiency, and the fluorescence YL can be used at improved efficiency.

Further, in the light source apparatus 10 according to the first embodiment, the substrate 12 has the first side surfaces 30b, which incline with respect to the front surface 12a toward the lid 16 with distance along the traveling direction of the excitation light L, and the wavelength converters 29 are provided on the first side surfaces 30b.

According to the configuration described above, the wavelength converters 29 are disposed in the paths along which the excitation light L travels, whereby the excitation light can be efficiently guided to the wavelength converters 29 without being refracted or reflected. The excitation light L can therefore efficiently excite the phosphor layers 50 of the wavelength converters 29 to generate the fluorescence YL.

First Variation

A light source apparatus according to a first variation will be subsequently described. The basic configuration of the light source apparatus according to the first variation is the same as that according to the first embodiment but differs from the first embodiment in terms of the configuration of the substrate. Therefore, the overall light source apparatus will not be described, and only the configuration different from that in the first embodiment will be described.

Figure 5:
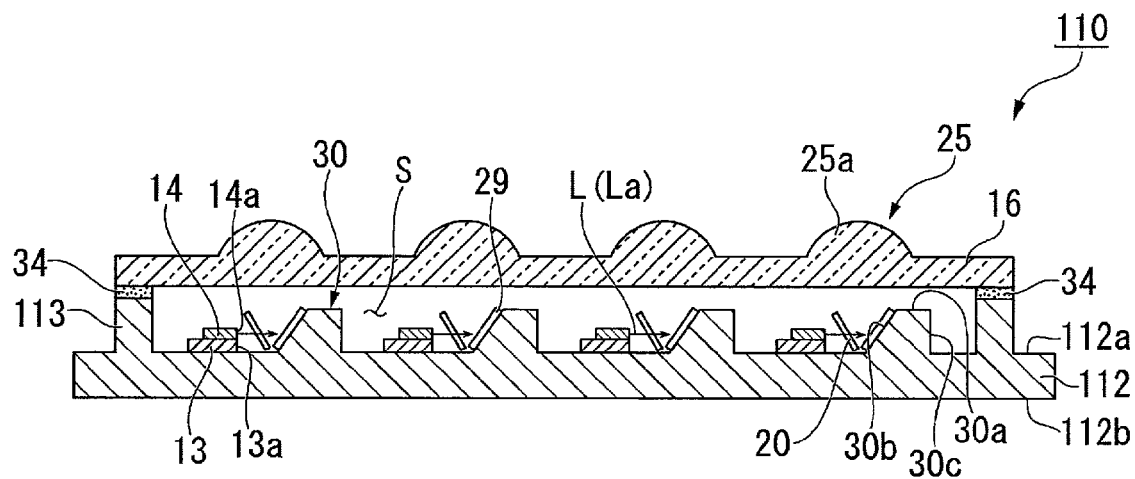
FIG. 5 is a cross-sectional view of a light source apparatus according to a first variation.

FIG. 5 is a cross-sectional view of the light source apparatus according to the first variation. In FIG. 5, components common to those in the drawings used in the first embodiment have the same reference characters and will not be described.

A light source apparatus 110 according to the first variation includes a substrate 112, the plurality of sub-mounts 13, the plurality of light emitters 14, the lid 16, a plurality of lead terminals (not shown), the plurality of wavelength converters 29, and the plurality of wavelength selectors 20, as shown in FIG. 5.

The substrate 112 is formed of a plate having a front surface 112a (first surface), a rear surface 112b, a frame 113 provided on the front surface 112a. The plurality of light emitters 14 are provided at the side facing the front surface 112a of the substrate 112 via the plurality of sub-mounts 13. A heat dissipating member (not shown), such as a heat sink, is provided as appropriate on the rear surface 112b of the substrate 112.

The frame 113 is so provided as to protrude toward the front surface 112a of the substrate 112. The frame 113 is so integrated with the substrate 112 as to surround the plurality of light emitters 14. The frame 113 maintains a fixed distance (gap) between the substrate 112 and the lid 16 and forms part of the accommodation space S, which accommodates the plurality of light emitters 14, as the frame 15 in the first embodiment does. The substrate 122 is made of a metal material having high thermal conductivity, such as copper and aluminum. That is, the frame 113 in the first variation also serves as the frame 15 in the first embodiment.

The lid 16 is so provided as to face the front surface 112a of the substrate 112 and is bonded to the upper surface of the frame 113, which protrudes from the front surface 112a, via a bonding material 34, such as an organic adhesive, a metal bonding material, and an inorganic bonding material.

The light source apparatus 110 according to the first variation also provides the same effects as those provided by the first embodiment. That is, the first variation provides excellent heat dissipation performance of the wavelength converters 29, compactness of the light source apparatus 110, and efficient use of the fluorescence YL. In the first variation, in particular, the substrate 112 and the frame 113 are integrated with each other into a unitary member, whereby the configuration of the light source apparatus can be further simplified.

Second Variation

A light source apparatus according to a second variation will be subsequently described. The basic configuration of the light source apparatus according to the second variation is the same as that according to the first embodiment but differs from the first embodiment in terms of the configuration of the lid. Therefore, the overall light source apparatus will not be described, and only the configuration different from that in the first embodiment will be described.

Figure 6:
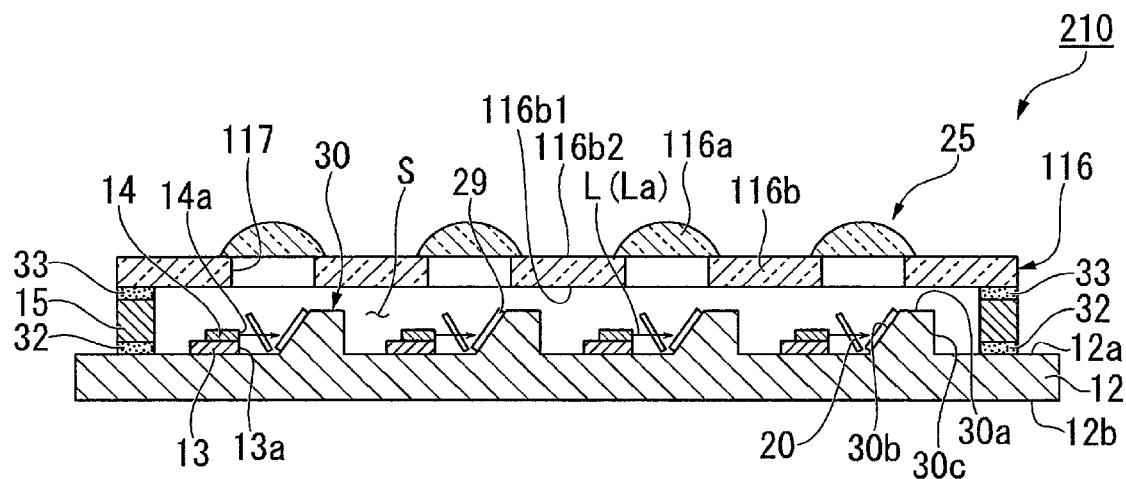
FIG. 6 is a cross-sectional view of a light source apparatus according to a second variation.

FIG. 6 is a cross-sectional view of the light source apparatus according to the second variation. In FIG. 6, components common to those in the drawings used in the first embodiment have the same reference characters and will not be described.

A light source apparatus 210 according to the second variation includes the substrate 12, the plurality of sub-mounts 13, the plurality of light emitters 14, the frame 15, a lid 116, a plurality of lead terminals (not shown), the plurality of wavelength converters 29, and the plurality of wavelength selectors 20, as shown in FIG. 6.

The lid 116 in the second variation includes a plurality of lenses 116a and a support member 116b, to which the plurality of lenses 116a are bonded. In the second variation, the plurality of lenses 116a are bonded to one of the two surfaces of the support member 116b that is an upper surface 116b2, which is opposite a lower surface 116b1 facing the front surface 12a of the substrate 12.

The support member 116b is formed of a plate having a rectangular shape in the plan view and has openings 117 in positions corresponding to the paths of the fluorescence YL outputted from the wavelength converters 29. That is, the number of openings 117 of the support member 116b is equal to the number of wavelength converters 29. The support member 116b is bonded to a side of the frame 15 that is the side opposite the substrate 12. The support member 116b is made of a metal material, for example, copper and aluminum. A plated layer made, for example, of nickel may be provided on the surface of the support member 116b. The support member 116b may instead be made of a resin material.

The plurality of lenses 116a are each formed of a planoconvex lens. The lenses 116a each formed of a planoconvex lens have the function of parallelizing the fluorescence YL outputted from the wavelength converters 29 and the fluorescence YL outputted from the wavelength converters 29 and reflected off the wavelength selectors 20. The lenses 116a have an outer dimension one size greater than the outer dimension of the openings 117 of the support member 116b.

In a case where the lid needs to have no refractive index, a transmissive planar plate may be inserted into each of the openings 117. The lenses 116a may be bonded to the lower surface 116b1 of the support member 116b. In this case, the distance between the wavelength converters 29 and the lenses 116a is shortened, whereby the light flux width of the fluorescence YL parallelized by the lenses 116a is further reduced.

The light source apparatus 210 according to the second variation also provides the same effects as those provided by the first embodiment. That is, the second variation provides excellent heat dissipation performance of the wavelength converters 29, compactness of the light source apparatus 210, and efficient use of the fluorescence YL. In the second variation, in particular, in which the lenses 116a and the support member 116b are members separate from each other, the positions where the lenses 116a are attached to the support member 116b can be adjusted, whereby the lenses 116a and the wavelength converters 29 can be aligned with each other with precision. The lenses 116a can therefore extract the fluorescence YL with precision.

Second Embodiment

A light source apparatus according to a second embodiment will be subsequently described. Configurations and members common to those in the first embodiment have the same reference characters and will not be described in detail.

Figure 7:
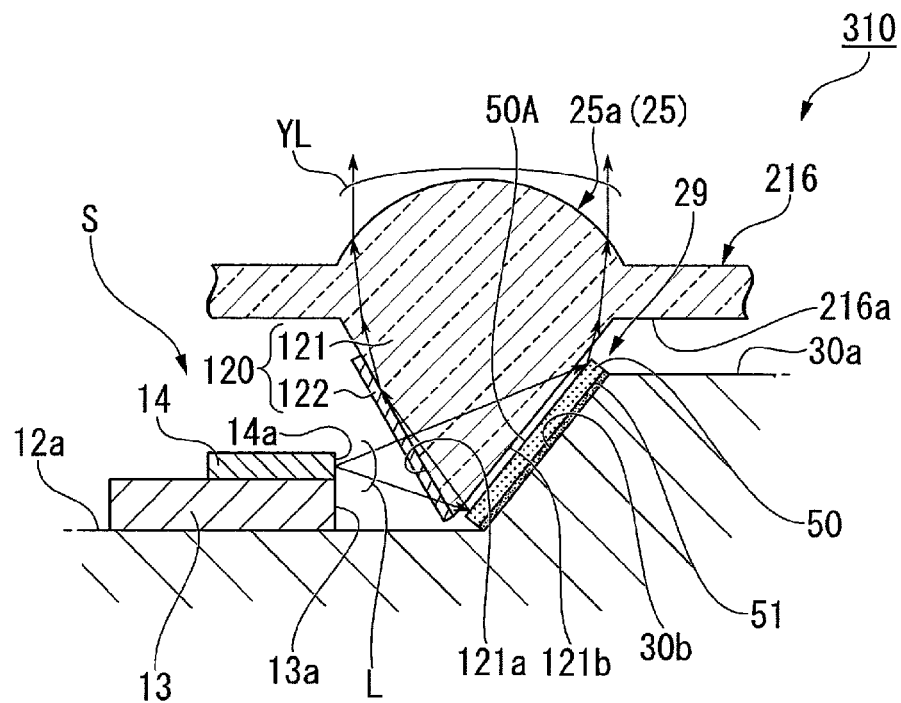
FIG. 7 is an enlarged view of the configuration of key parts of a light source apparatus according to a second embodiment.

FIG. 7 is an enlarged view of the configuration of key parts of the light source apparatus according to the second embodiment. Specifically, FIG. 7 corresponds to FIG. 4 in the first embodiment.

A light source apparatus 310 according to the second embodiment includes the substrate 12, the plurality of submounts 13, the plurality of light emitters 14, the frame 15 (not shown), a lid 216, a plurality of lead terminals (not shown), the plurality of wavelength converters 29, and a plurality of wavelength selectors 120, as shown in FIG. 7.

In the second embodiment, the wavelength selectors 120 include a plurality of prisms 121 (optical elements) and a plurality of dichroic films 122 (first optical films). The prisms 121 each have a front surface 121a (second surface), which faces the corresponding light emitter 14, and a rear surface 121b and have a triangular cross section. In the second embodiment, the prisms 121 are integrated with the lid 216.

The lid 216 in the second embodiment has the same basic configuration as that of the lid 16 in the first embodiment, and the collimator lens unit 25 is integrated with a surface of the lid 216 that is the surface opposite the substrate 12. The prisms 121 are integrated with an inner surface 216a of the lid 216, which is the surface facing the substrate 12. The prisms 121 are disposed in correspondence with the wavelength converters 29. The number of prisms 121 integrated with the lid 216 in the second embodiment is therefore equal to the number of wavelength converters 29 (16 in the second embodiment).

In the second embodiment, the dichroic films 122 are provided on the front surfaces 121a (second surfaces) of the prisms 121, which are the surfaces facing the light emitters 14. The rear surfaces 121b of the prisms 121 face the upper surfaces 50A of the phosphor layers 50 in the wavelength converters 29. That is, the rear surfaces 121b of the prisms 121 function as surfaces on which the fluorescence YL emitted from the phosphor layers 50 is incident. An antireflection film (not shown) is provided on the rear surface 121b of each of the prisms 121. The rear surfaces 121b of the prisms 121 therefore allow the fluorescence YL emitted from the phosphor layers 50 to be efficiently introduced into the prisms 121.

In the light source apparatus 310 according to the second embodiment, the excitation light L emitted from the light emitters 14 travels along the front surface 12a of the substrate 12 and enters the wavelength selectors 120. The excitation light L having entered the wavelength selectors 120 passes through the dichroic films 122 provided on the front surfaces 121a of the prisms 121, enters the prisms 121, passes through the rear surfaces 121b of the prisms 121, and enters the wavelength converters 29.

The fluorescence YL emitted from the phosphor layers 50 of the wavelength converters 29 enters the prisms 121 via the rear surfaces 121b thereof. The fluorescence YL having entered the prisms 121 is reflected off the dichroic films 122 of the wavelength selectors 20 and enters the lid 16. Part of the fluorescence YL reflected off the dichroic films 122 propagates in the prisms 121 while being totally reflected therein and then enters the lid 16. That is, the prisms 121 are provided in the optical paths of the excitation light L and the fluorescence YL.

The fluorescence YL having entered the lid 16 is parallelized by the lenses 25a of the collimation lens unit 25 integrated with the lid 16 and exits out of the lid 16. The wavelength selectors 120 thus separate the fluorescence YL having exited via the upper surfaces 50A of the phosphor layers 50 from the optical paths of the excitation light L, whereby the fluorescence YL efficiently exits out of the light source apparatus 310 via the lenses 25a.

The light source apparatus 310 according to the second embodiment described above provides the following effects.

The light source apparatus 310 according to the second embodiment also provides the same effects as those provided by the first embodiment. That is, the second embodiment provides excellent heat dissipation performance of the wavelength converters 29, compactness of the light source apparatus 310, and efficient use of the fluorescence YL.

Further, in the light source apparatus 310 according to the second embodiment, in which the prisms 121, which hold the dichroic films 122, are integrated with the lenses 25a, which parallelize the fluorescence YL, the number of parts of the apparatus can be reduced.

Moreover, in the light source apparatus 310 according to the second embodiment, the prisms 121 are provided in regions through which the excitation light L and the fluorescence YL pass. That is, the prisms 121 are allowed to be arranged in the optical paths of the excitation light L and the fluorescence YL, whereby the optical parts are disposed in the apparatus with increased flexibility. A compact configuration of the apparatus is therefore readily achieved.

Third Variation

A light source apparatus according to a third variation will be subsequently described. The basic configuration of the light source apparatus according to the third variation is the same as that according to the second embodiment but differs from the second embodiment in terms of the configuration of the prisms. Therefore, the overall light source apparatus will not be described, and only the configuration different from that in the second embodiment will be described.

Figure 8:
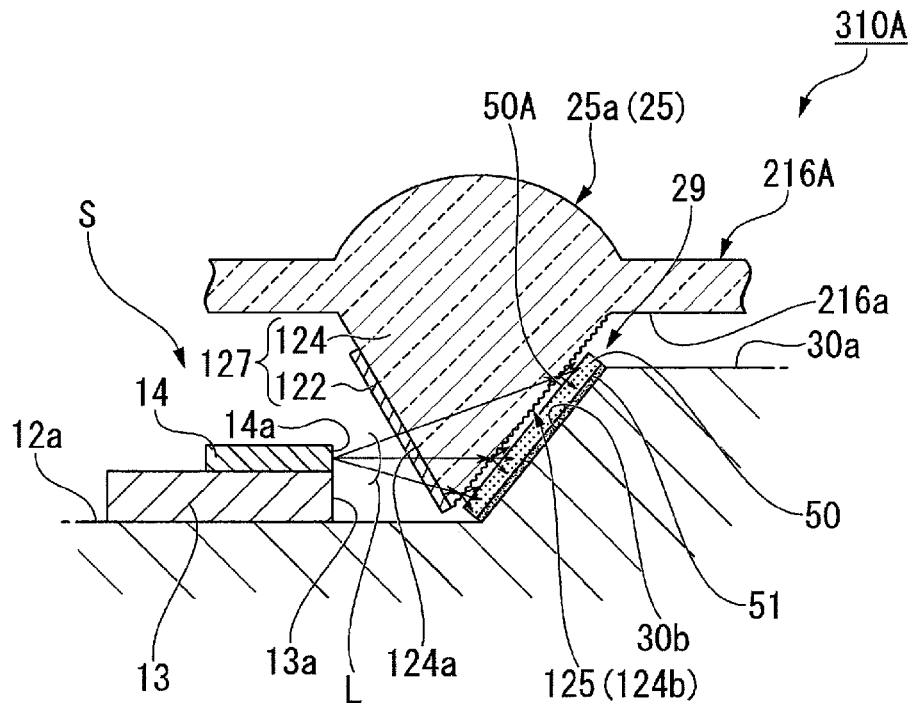
FIG. 8 is an enlarged view of the configuration of key parts of a light source apparatus according to a third variation.

FIG. 8 is an enlarged view of the configuration of key parts of the light source apparatus according to the third variation and corresponds to FIG. 7 in the second embodiment.

A light source apparatus 310A according to the third variation includes the substrate 12, the plurality of submounts 13, the plurality of light emitters 14, the frame 15 (not shown), a lid 216A, a plurality of lead terminals (not shown), the plurality of wavelength converters 29, and a plurality of wavelength selectors 127, as shown in FIG. 8.

In the third variation, the wavelength selectors 127 include prisms 124 (optical elements) and the plurality of dichroic films 122. The prisms 124 each have a front surface 124a (second surface), which faces the corresponding light emitter 14, and a rear surface 124b and have a triangular cross section. In the third variation, the prisms 124 are integrated with the lid 216A.

The lid 216A in the third variation has the same basic configuration as that of the lid 216 in the second embodiment, and the prisms 124 are integrated with the inner surface 216a of the lid 216A, which is the surface facing the substrate 12. The dichroic films 122 are provided on the front surfaces 124a (second surfaces) of the prisms 124, which are the surfaces facing the light emitters 14. The rear surfaces 124b of the prisms 124 face the upper surfaces 50A of the phosphor layers 50 in the wavelength converters 29. In the third variation, the rear surface 124b of each of the prisms 124 is provided with irregularities 125.

In the light source apparatus 310A according to the third variation, the excitation light L emitted from the light emitters 14 travels along the front surface 12a of the substrate 12 and enters the wavelength selectors 127. The excitation light L having entered the wavelength selectors 127 passes through the dichroic films 122 provided on the front surfaces 124a of the prisms 124, enters the prisms 124, passes through the rear surfaces 124b of the prisms 124, and enters the wavelength converters 29. The excitation light L is diffused when passing through the irregularities 125 provided in the rear surfaces 124b. According to the third variation, the diffused excitation light L that enters the phosphor layers 50 of the wavelength converters 29 can have an averaged intensity distribution. The optical conversion efficiency of the phosphor layers 50 can thus be improved.

Fourth Variation

A light source apparatus according to a fourth variation will be subsequently described. The basic configuration of the light source apparatus according to the fourth variation is the same as that according to the second embodiment but differs from the second embodiment in terms of the configuration of the prisms. Therefore, the overall light source apparatus will not be described, and only the configuration different from that in the second embodiment will be described.

Figure 9:
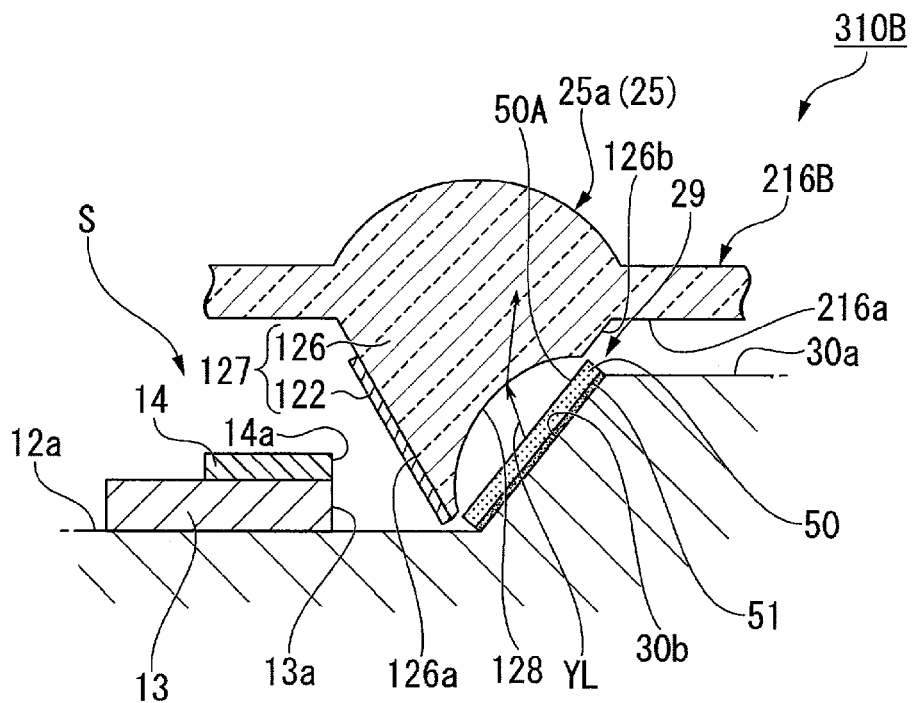
FIG. 9 is an enlarged view of the configuration of key parts of a light source apparatus according to a fourth variation.

FIG. 9 is an enlarged view of the configuration of key parts of the light source apparatus according to the fourth variation and corresponds to FIG. 7 in the second embodiment.

A light source apparatus 310B according to the fourth variation includes the substrate 12, the plurality of sub-mounts 13, the plurality of light emitters 14, the frame 15 (not shown), a lid 216B, a plurality of lead terminals (not shown), the plurality of wavelength converters 29, and the plurality of wavelength selectors 127, as shown in FIG. 9.

In the fourth variation, the wavelength selectors 127 include prisms 126 (optical elements) and the plurality of dichroic films 122. The prisms 126 each have a front surface 126a (second surface), which faces the corresponding light emitter 14, and a rear surface 126b and have a substantially triangular cross section. In the fourth variation, the prisms 126 are integrated with the lid 216B.

The lid 216B in the fourth variation has the same basic configuration as that of the lid 216 in the second embodiment, and the prisms 126 are integrated with the inner surface 216a of the lid 216B, which is the surface facing the substrate 12. The dichroic films 122 are provided on the front surfaces 126a (second surfaces) of the prisms 126, which are the surfaces facing the light emitters 14. The rear surfaces 126b of the prisms 126 face the upper surfaces 50A of the phosphor layers 50 in the wavelength converters 29. In the fourth variation, the rear surface 126b of each of the prisms 126 is provided with a concave surface 128 formed of a curved surface. The concave surface 128 functions as a concave lens surface that spreads the fluorescence YL emitted from the phosphor layer 50 of the corresponding wavelength converter 29.

In the light source apparatus 310B according to the fourth variation, part of the fluorescence YL emitted from the phosphor layers 50 of the wavelength converters 29 is deflected in the vertical upward/downward direction (upward/downward direction in FIG. 9) when passing through the concave surfaces 128 provided as part of the rear surfaces 126b. The concave surfaces 128 therefore allow the fluorescence YL to efficiently enter the lenses 25a provided on the lid 216B, whereby the optical use efficiency of the lenses 25a can be improved.

Fifth Variation

A light source apparatus according to a fifth variation will be subsequently described. The basic configuration of the light source apparatus according to the fifth variation is the same as that according to the second embodiment but differs from the second embodiment in terms of the configuration of the prisms. Therefore, the overall light source apparatus will not be described, and only the configuration different from that in the second embodiment will be described.

Figure 10:
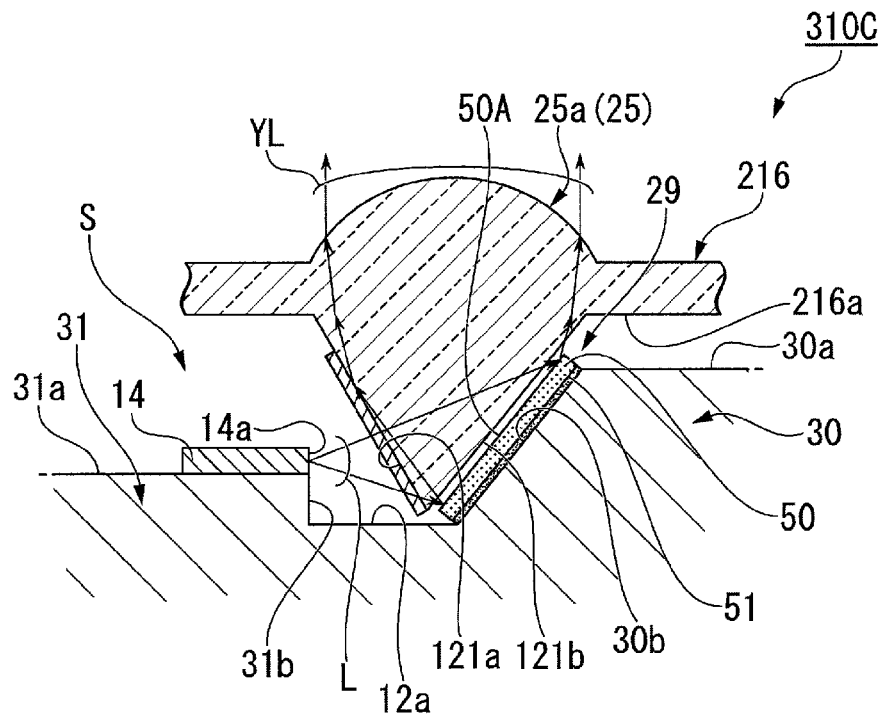
FIG. 10 is an enlarged view of the configuration of key parts of a light source apparatus according to a fifth variation.

FIG. 10 is an enlarged view of the configuration of key parts of the light source apparatus according to the fifth variation and corresponds to FIG. 7 in the second embodiment.

A light source apparatus 310C according to the fifth variation includes the substrate 12, the plurality of light emitters 14, the frame 15 (not shown), the lid 216, a plurality of lead terminals (not shown), the plurality of wavelength converters 29, and the plurality of wavelength selectors 120, as shown in FIG. 10.

In the fifth variation, the plurality of light emitters 14 are directly mounted on the substrate 12. A light emitter holder 31, which holds the light emitters 14, is integrated with the substrate 12 in the fifth variation. The light emitter holder 31 has upper surfaces 31a located above the front surface 12a. Steps are present between the front surfaces 12a of the substrate 12 and the upper surfaces 31a of the light emitter holder 31. In the fifth variation, the light emitters 14 are so placed on the substrate 12 that the light exiting surfaces 14a are substantially flush with end surfaces 31b of the light emitter holder 31 that are surfaces facing the wavelength converters 29.

The light source apparatus 310C according to the fifth variation allows the light emitters 14 to be directly provided on the substrate 12 with no sub-mounts 13 interposed therebetween, whereby the heat from the light emitters 14 can be efficiently discharged to the substrate 12.

Further, in the light source apparatus 310C according to the fifth variation, the excitation light L emitted from the light emitters 14 disposed on the light emitter holder 31 travels along the front surface 12a of the substrate 12 and enters the wavelength selectors 120. In the fifth variation, the steps provided between the front surface 12a and the upper surfaces 31a prevent the excitation light L emitted from the light emitters 14 from being blocked by the front surface 12a of the substrate 12. The excitation light L emitted from the light emitters 14 can therefore efficiently enter the phosphor layers 50 of the wavelength converters 29.

The configuration of the first or second variation described above may be applied to the light source apparatus 310 according to the second embodiment, the light source apparatus 310A according to the third variation, the light source apparatus 310B according to the fourth variation, and the light source apparatus 310C according to the fifth variation.

Third Embodiment

A light source apparatus according to a third embodiment will be subsequently described. Configurations and members common to those in the first embodiment have the same reference characters and will not be described in detail.

Figure 11:
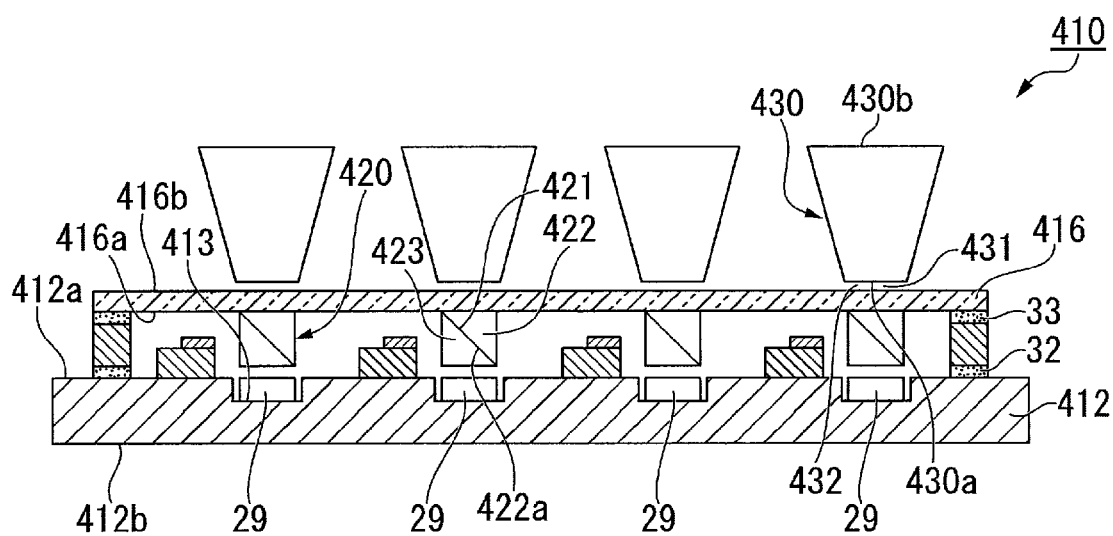
FIG. 11 is a cross-sectional view of a light source apparatus according to a third embodiment.

FIG. 11 is a cross-sectional view of the light source apparatus according to the third embodiment. FIG. 11 corresponds to FIG. 2 in the first embodiment.

A light source apparatus 410 according to the third embodiment includes a substrate 412, the plurality of sub-mounts 13, the plurality of light emitters 14, the frame 15, a lid 416, the plurality of lead terminals 17 (not shown), the plurality of wavelength converters 29, a plurality of dichroic prisms 420, and a plurality of rods 430, as shown in FIG. 11.

The substrate 412, the frame 15, and the lid 416 are members separate from one another and bonded to each other via the bonding materials 32 and 33.

The substrate 412 is formed of a plate having a front surface 412a (first surface) and a rear surface 412b opposite the front surface 412a. The plurality of light emitters 14 are provided on the side facing the front surface 412a of the substrate 412 via the plurality of sub-mounts 13. A heat dissipating member (not shown), such as a heat sink, is provided as appropriate on the rear surface 412b of the substrate 412.

In the third embodiment, the substrate 412 includes a plurality of recesses 413 provided in the front surface 412a. The recesses 413 are disposed in correspondence with the light emitters 14. The plurality of recesses 413 form accommodation portions that accommodate the plurality of wavelength converters 29. The depth of the recesses 413 is so set that the upper surfaces of the wavelength converters 29 accommodated in the recesses 413 are substantially flush with the front surface 412a of the substrate 412.

The plurality of dichroic prisms 420 are disposed in correspondence with the wavelength converters 29. The dichroic prisms 420 are each disposed above the corresponding wavelength converter 29. In the third embodiment, the dichroic prisms 420 are provided in the optical path of the excitation light L emitted from the light emitters 14 and the optical path of the fluorescence YL outputted from the wavelength converters 29.

The dichroic prisms 420 each include a dichroic film 421 (first optical film) and triangular prisms 422 and 423 (optical elements). The dichroic film 421 is provided on a bottom surface 422a (second surface) of the triangular prism 422. The triangular prism 423 is bonded to the dichroic film 422.

The dichroic film 421 is formed of an optical film optically characterized in that it reflects the excitation light L and transmits the fluorescence YL. The thus configured dichroic prisms 420 can reflect the excitation light L and transmit the fluorescence YL outputted from the wavelength converters 29.

The dichroic prisms 420 are so disposed as to reflect the excitation light L emitted from the light emitters 14 to guide the excitation light L to the wavelength converters 29 and transmit the fluorescence YL emitted from the phosphor layers 50 of the wavelength converters 29 to extract the fluorescence YL out of the light source apparatus 410. In the third embodiment, the dichroic prisms 420 are bonded to an inner surfaces 416b of the lid 416. The lid 416 is formed of a transmissive plate.

The plurality of rods 430 (second optical elements) are disposed in correspondence with the wavelength converters 29. In the third embodiment, the rods 430 guide the fluorescence YL outputted from the wavelength converters 29 to homogenize the illuminance distribution of the fluorescence YL. The rods 430 are each formed of a transmissive member made, for example, of optical glass, including borosilicate glass, such as BK7, quartz glass, and synthetic quartz glass, crystal quartz, or sapphire.

The rods 430 each have a light incident surface 430a and a light exiting surface 430b and have a tapered rod structure in which the cross-sectional area perpendicular to the center axis of the rod increases with distance from the light incident surface 430a toward the light exiting surface 430b. The cross section of each of the rods 430 perpendicular to the center axis may have a circular or quadrangular shape.

Figure 12:
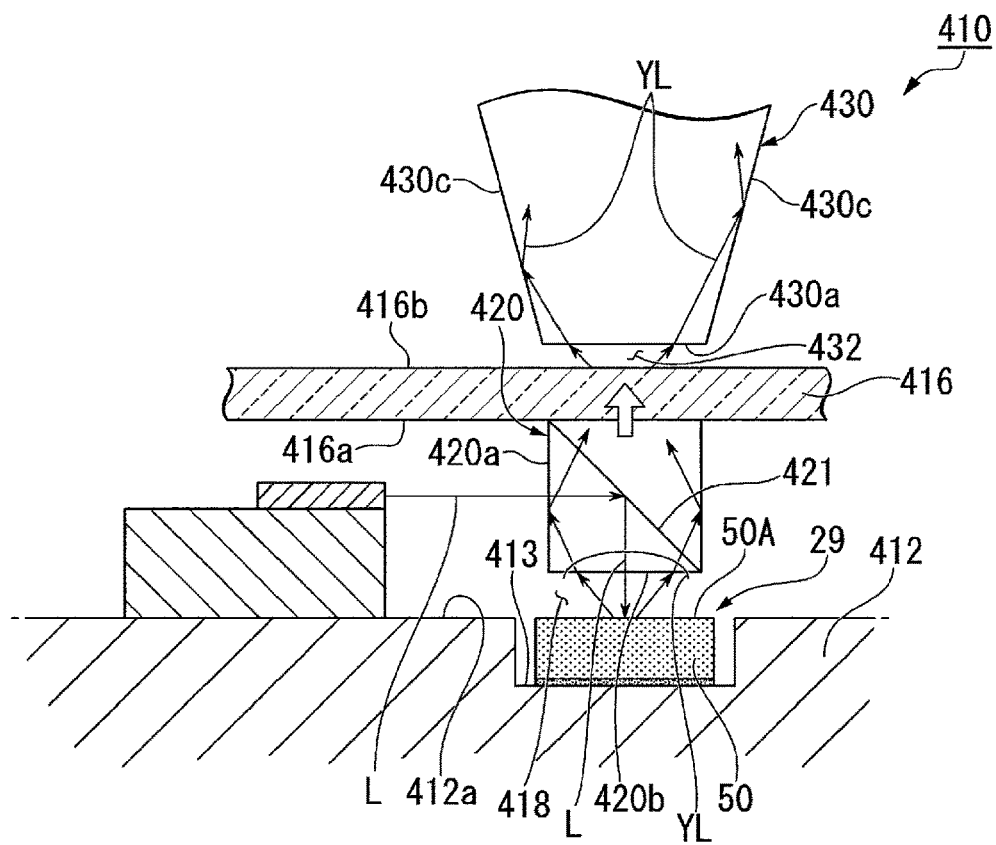
FIG. 12 is an enlarged view of the configuration of one of light emitters and therearound.

FIG. 12 is an enlarged view of the configuration of one of the light emitters and therearound.

The dichroic prisms 420 each have a first light incident surface 420a, on which the excitation light L emitted from the corresponding light emitter 14 is incident, and a second light incident surface 420b, on which the fluorescence YL outputted from the corresponding wavelength converter 29 is incident, as shown in FIG. 12.

A gap is provided between each of the dichroic prisms 420 and the upper surface 50A of the corresponding phosphor layer 50. That is, a first air layer 418 (first low-refractive-index layer), the refractive index of which is smaller than those of the wavelength converters 29 and the dichroic prisms 420 (triangular prisms 422 and 423), is provided between the wavelength converter 29 and the dichroic prism 420. The first air layer 418 may be replaced with a resin layer having a refractive index smaller those of the wavelength converters 29 and the dichroic prisms 420.

The rods 430 are each so disposed that a gap is created between the light incident surface 430a and an outer surface 416b of the lid 416 (surface opposite wavelength converters 29). That is, the rods 430 are so disposed as to face the outer surface 416b of the lid 416 via a second air layer 432 (second low-refractive-index layer), the refractive index of which is smaller than that of the lid 416. The second air layer 423 may be replaced with a resin layer having a refractive index smaller that of the lid 416.

In the light source apparatus 410 according to the third embodiment, the excitation light L emitted from the light emitters 14 travels along the front surface 412a of the substrate 412 and is incident on the first light incident surfaces 420a of the dichroic prisms 420. The excitation light L is reflected off the dichroic films 421 of the dichroic prisms 420 and enters the wavelength converters 29. The phosphor layers 50 emit the fluorescence YL via the upper surfaces 50A. The fluorescence YL having exited via the upper surfaces 50A of the phosphor layers 50 radially spread.

The light source apparatus 410 according to the third embodiment described above provides the following effects.

The light source apparatus 410 according to the third embodiment also provides the same effects as those provided by the first embodiment. That is, the third embodiment provides excellent heat dissipation performance of the wavelength converters 29, compactness of the light source apparatus 410, and efficient use of the fluorescence YL.

Further, in the light source apparatus 410 according to the third embodiment, in which the first air layers 418 are provided between the wavelength converters 29 and the dichroic prisms 420, the fluorescence YL is refracted at the second light incident surfaces 420b. Therefore, since the fluorescence YL is incident on the inner surfaces of the dichroic prisms 420 at an angle greater than the critical angle, the fluorescence YL is likely to propagate in the prisms while being totally reflected. The fluorescence YL is therefore efficiently taken into the dichroic prisms 420. The fluorescence YL can therefore be used at improved efficiency.

In the light source apparatus 410 according to the third embodiment, the fluorescence YL taken into each of the dichroic prisms 420 passes through the lid 416, exits via the outer surface 416b, and enters the corresponding rod 420. Since the fluorescence YL is taken into the rod 430, the radiation angle of the fluorescence YL decreases. The fluorescence YL outputted from the light source apparatus 410 therefore has a narrow radiation angle distribution, whereby the fluorescence YL can efficiently enter an optical system disposed on the downstream of the light source apparatus 410.

In the light source apparatus 410 according to the third embodiment, since the second air layers 432 are provided between the lid 416 and the rods 430, the fluorescence YL is refracted when incident on the light incident surfaces 430a of the rods 430. Therefore, since the fluorescence YL is incident on side surfaces 430c of the rods 430 at an angle greater than the critical angle, the fluorescence YL is likely to propagate in the rods 430 while being totally reflected off the side surfaces 430c of the rods 430. The fluorescence YL can therefore efficiently propagate in the rods 430.

Sixth Variation

A light source apparatus according to a sixth variation will be subsequently described. The light source apparatus according to the sixth variation is a variation of the light source apparatus according to the third embodiment. The overall light source apparatus will not be described, and only the configuration different from that in the third embodiment will be described.

Figure 13:
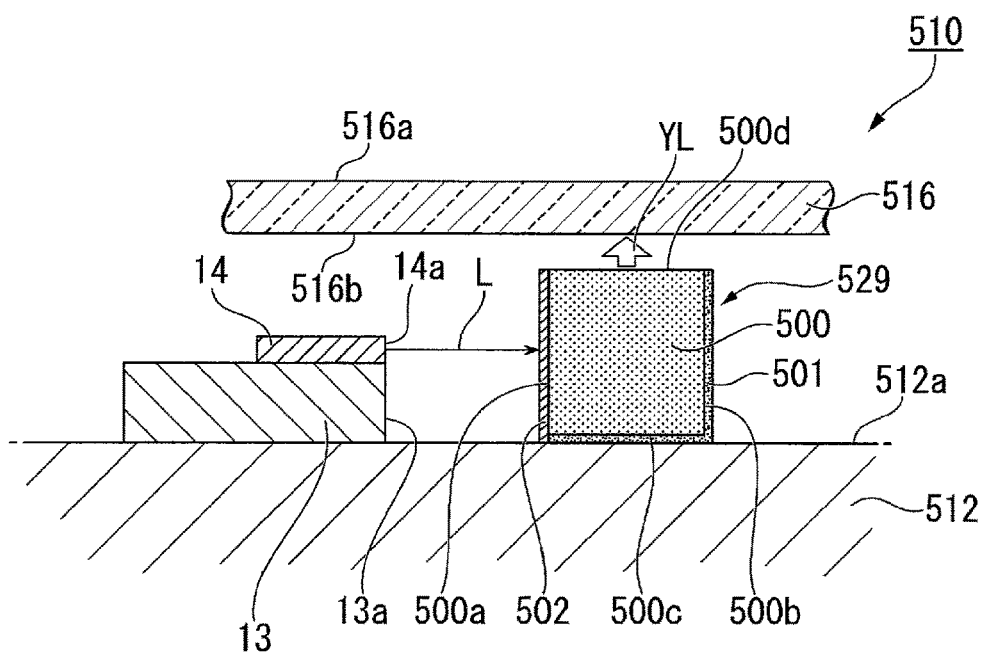
FIG. 13 is an enlarged view of the configuration of key parts of a light source apparatus according to a sixth variation.

FIG. 13 is an enlarged view of the configuration of key parts of the light source apparatus according to the sixth variation.

A light source apparatus 510 according to the sixth variation includes a substrate 512, the plurality of light emitters 14, the frame 15 (not shown), a lid 516, a plurality of lead terminals (not shown), a plurality of wavelength converters 529, and a plurality of first optical films 502, as shown in FIG. 13.

In the sixth variation, the light emitters 14 and the wavelength converters 529 are mounted on a front surface 512a (first surface) of the substrate 512. The wavelength converters 529 each include a phosphor layer 500 and a reflection film 501. The phosphor layer 500 has the same configuration as that of the phosphor layer 50 in the third embodiment and has a first side surface 500a, which faces the corresponding light emitter 14, a second side surface 500b, which is opposite the first side surface 500a, a bottom surface 500c, and an upper surface 500d.

In the sixth variation, the first optical films 502 are provided on the first side surfaces 500a of the phosphor layers 500. The first optical films 502 are each characterized in that it transmits the excitation light L and reflects the fluorescence YL. The reflection films 501 are each so provided as to cover surfaces of the corresponding phosphor layer 500 excluding the upper surface 500d, for example, the bottom surface 500c and the second side surface 500b. The reflection films 501 are each formed of a mirror that reflects both the excitation light L and the fluorescence YL.

In the light source apparatus 510 according to the sixth variation, the excitation light L passes through the first optical films 502 and enters the phosphor layers 500. The fluorescence YL generated in the phosphor layers 500 is reflected off the first optical films 502 and the reflection films 501, exits via the upper surfaces 500d, is incident on a lower surface 516b of the lid 516, and exits out of the light source apparatus 510 via an upper surface 516a of the lid 516.

The light source apparatus 510 according to the sixth variation also provides the same effects as those provided by the third embodiment. That is, the sixth variation provides excellent heat dissipation performance of the wavelength converters 529, compactness of the light source apparatus 510, and efficient use of the fluorescence YL. In the sixth variation, in particular, since the first optical films 502 are directly provided on the phosphor layers 500, no members for supporting the first optical films 502 are required. The number of parts of the light source apparatus 510 can therefore be reduced.

Seventh Variation

A light source apparatus according to a seventh variation will be subsequently described. The light source apparatus according to the seventh variation is a variation of the light source apparatus according to the third embodiment. The overall light source apparatus will not be described, and only the configuration different from that in the third embodiment will be described.

Figure 14:
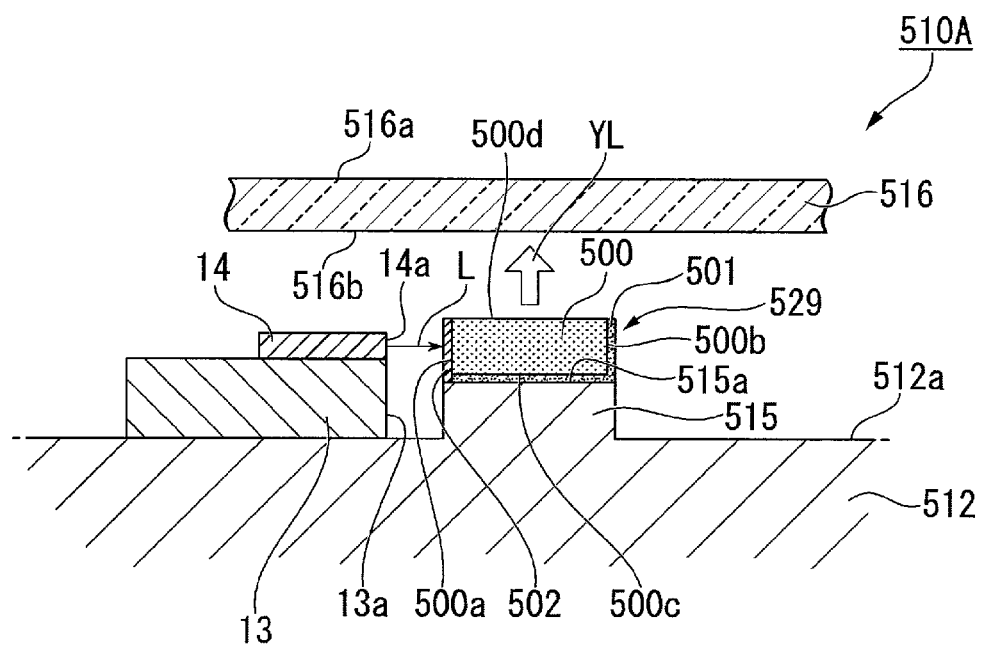
FIG. 14 is an enlarged view of the configuration of key parts of a light source apparatus according to a seventh variation.

FIG. 14 is an enlarged view of the configuration of key parts of the light source apparatus according to the seventh variation.

A light source apparatus 510A according to the seventh variation includes the substrate 512, the plurality of light emitters 14, the frame 15 (not shown), the lid 516, a plurality of lead terminals (not shown), the plurality of wavelength converters 529, and the plurality of first optical films 502, as shown in FIG. 14.

In the seventh variation, the wavelength converters 529 are each mounted on an upper surface 515a of a wavelength converter holder 515 provided on the first surface 512a of the substrate 512. The upper surface 515a of the wavelength converter holder 515 is located above the first surface 512a of the substrate 512. In the light source apparatus 510A according to the seventh variation, the wavelength converters 529 are held on the wavelength converter holders 515, whereby the thickness of the wavelength converters 529 (phosphor layers 500) can be reduced as compared with the thickness in the configuration of the light source apparatus 510 according to the sixth variation. The cost of the apparatus can therefore be lowered.

The configuration of the first or second variation described above may be applied to the light source apparatus 410 according to the third embodiment, the light source apparatus 510 according to the sixth variation, and the light source apparatus 510A according to the seventh variation.

Fourth Embodiment

An example of a projector according to a fourth embodiment will be described below, but an embodiment of the projector is not limited to the example.

Figure 15:
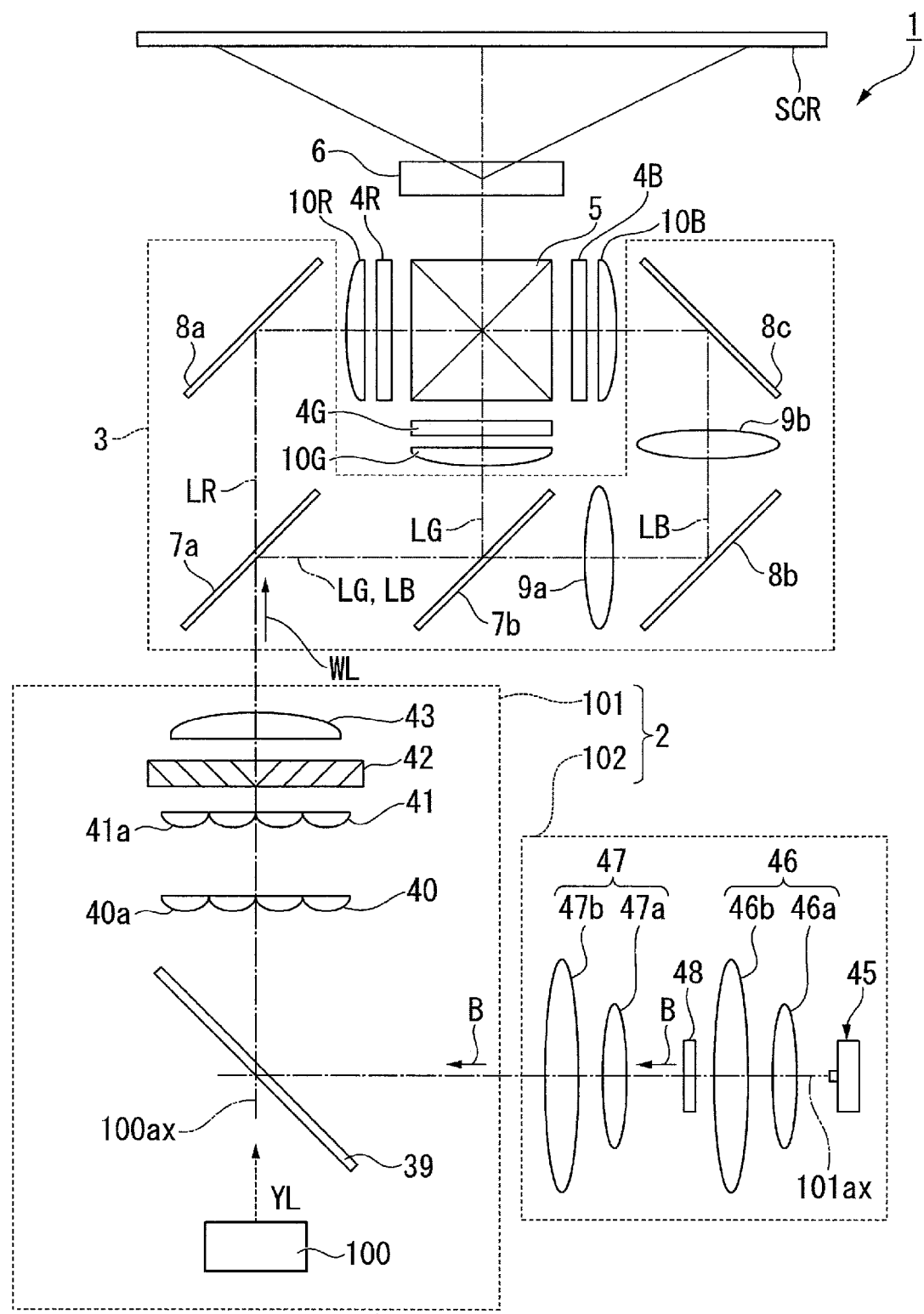
FIG. 15 shows a schematic configuration of a projector according to a fourth embodiment.

FIG. 15 shows a schematic configuration of the projector according to the fourth embodiment.

A projector 1 according to the fourth embodiment is a projection-type image display apparatus that displays color video images on a screen SCR, as shown in FIG. 15. The projector 1 includes an illuminator 2, a color separation system 3, a light modulator 4R, a light modulator 4G, and a light modulator 4B, a light combining apparatus 5, and a projection optical apparatus 6.

The illuminator 2 outputs illumination light WL containing at least red light LR, green light LG, and blue light LB (see FIG. 2) or three-primary-color light. The color separation system 3 separates the illumination light WL into the red light LR, the green light LG, and the blue light LB. In the present specification, the red light LR refers to visible red light having a peak wavelength longer than or equal to 590 nm but shorter than or equal to 700 nm, the green light LG refers to visible green light having a peak wavelength longer than or equal to 500 nm but shorter than or equal to 590 nm, and the blue light LB refers to visible blue light having a peak wavelength longer than or equal to 400 nm but shorter than or equal to 500 nm.

The color separation system 3 includes a first dichroic mirror 7a, a second dichroic mirror 7b, a first total reflection mirror 8a, a second total reflection mirror 8b, and a third total reflection mirror 8c. The first dichroic mirror 7a separates the illumination light WL from the illuminator 2 into the red light LR and the other light (blue light LB and green light LG). The first dichroic mirror 7a reflects the blue light LB and the green light LG and transmits the red light LR. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

A first relay lens 9a and a second relay lens 9b are disposed in the optical path of the blue light LB on the downstream of the second dichroic mirror 7b.

The light modulator 4B modulates the blue light LB in accordance with image information to form blue image light. The light modulator 4G modulates the green light LG in accordance with image information to form green image light. The light modulator 4R modulates the red light LR in accordance with image information to form red image light. The light modulators 4B, 4G, and 4R are each formed, for example, of a transmissive liquid crystal panel.

Polarizers that are not shown are disposed on the light incident side and the light exiting side of each of the light modulators 4B, 4G, and 4R. Field lenses 10B, 10G, and 10R are disposed on the light incident side of the light modulators 4B, 4G, and 4R, respectively.

The image light from each of the light modulators 4B, 4G, and 4G enters the light combining apparatus 5. The light combining apparatus 5 combines the blue image light, the green image light, and the red image light with one another and causes the combined image light to exit toward the projection optical apparatus 6. The light combining apparatus 5 is formed, for example, of a cross dichroic prism.

The projection optical apparatus 6 enlarges the combined image light from the light combining apparatus 5 and projects the enlarged image light toward the screen SCR. Enlarged color video images are displayed on the screen SCR. The projection optical apparatus 6 is, for example, a lens unit formed of a lens barrel and a plurality of lenses disposed in the lens barrel.

The configuration of the illuminator 2 will be subsequently described.

The illuminator 2 includes a first illuminator 101 and a second illuminator 102.

The first illuminator 101 includes a first light source 100 (light source), a dichroic mirror 39, a first lens array 40, a second lens array 41, a polarization converter 42, and a superimposing lens 43.

The first light source 100 is formed of any of the light source apparatuses 10, 110, 210, 310, 310A, 310B, 310C, 410, 510, and 510A according to the embodiments and variations described above.

The fluorescence YL outputted from the first light source 100 is incident on the dichroic mirror 39. The dichroic mirror 39 is so disposed as to intersect each of an optical axis 101ax of the second illuminator 102 and an illumination optical axis 100ax of the illuminator 2 at 45°. The dichroic mirror 39 is characterized in that it transmits the fluorescence YL and reflects blue light B from the second illuminator 102.

The second illuminator 102 includes a second light source 45, a second light collection system 46, a scatter plate 48, and a pickup system 47.

The second light source 45 includes a semiconductor laser that emits the blue light B, which is formed of laser light, and a collimator lens that parallelizes the blue light B emitted from the semiconductor laser. The second light source 45 may include at least one semiconductor laser and collimator lens or may include a plurality of semiconductor lasers and collimator lenses. The intensity of the emitted blue light beam B peaks, for example, at 445 nm. The semiconductor laser can instead be a laser that emits blue light having a wavelength other than 445 nm, for example, 455 nm or 460 nm.

The second light collection system 46 includes a first lens 46a and a second lens 46b. The second light collection system 46 collects the blue light B from the second light source 45 into a spot in the vicinity of the scatter plate 48. The first lens 46a and the second lens 46b are each formed of a convex lens.

The scatter plate 48 scatters the blue light B from the second light source 45 in such a way that the scattered blue light B has a light orientation distribution similar to the light orientation distribution of the fluorescence YL generated in the first illuminator 101. The scatter plate 48 is formed, for example, of a ground glass plate made of optical glass.

The pickup system 47 includes a first lens 47a and a second lens 47b and substantially parallelizes the light from the scatter plate 48. The first lens 47a and the second lens 47b are each formed of a convex lens.

The first lens array 40 includes a plurality of first lenslets 40a for dividing the light from the dichroic mirror 39 into a plurality of sub-light fluxes. The plurality of first lenslets 40a are arranged in a matrix in a plane perpendicular to the illumination optical axis 100ax.

The second lens array 41 includes a plurality of second lenslets 41a corresponding to the plurality of first lenslets 40a of the first lens array 40. The second lens array 41 forms, along with the superimposing lens 43, images of the first lenslets 40a of the first lens array 40 in the vicinity of an image formation region of each of the light modulators 4R, 4G, and 4B. The plurality of second lenslets 41a are arranged in a matrix in a plane perpendicular to the illumination optical axis 100ax.

The polarization converter 42 aligns the polarization directions of the illumination light WL with one another. The polarization converter 42 includes, for example, polarization separation films, retardation plates, and mirrors. The polarization converter 42 converts one polarized light component into another polarized light component, for example, a P-polarized light component into an S-polarized light component to align the polarization directions of the fluorescence YL, which is non-polarized light, with the polarization direction of the blue light B.

The superimposing lens 43 collects the sub-light fluxes from the polarization converter 42 and superimposes the collected sub-light fluxes on one another in the vicinity of the image formation region of each of the light modulators 4R, 4G, and 4B. The first lens array 40, the second lens array 41, and the superimposing lens 43 form an optical integration system that homogenizes the in-plane optical intensity distribution of the illumination light WL.

The projector 1 according to the fourth embodiment described above provides the following effects.

The projector 1 according to the fourth embodiment includes the illuminator 2, which includes the first light source 100, the light modulators 4B, 4G, and 4R, which modulate the blue light LB, the green light LG, and the red light LR from the illuminator 2 in accordance with image information to form image light, and the projection optical apparatus 6, which projects the image light described above. The projector 1 according to the fourth embodiment, which includes the first illuminator 101 including the first light source 100, which excels in the heat dissipation performance of the wavelength converters, is compact, and can efficiently use the fluorescence, can therefore form and project a high-luminance image with the size of the projector 1 reduced.

The above embodiments have been described with reference to the case where the present disclosure is applied to a transmissive projector, and the present disclosure is also applicable to a reflective projector.

The term "transmissive" used herein means that a liquid crystal light valve including a liquid crystal panel or any other component transmits light. The term "reflective" means that the liquid crystal light valve reflects light. The light modulators are not each limited to a liquid crystal light valve and may instead each be a digital micromirror device.

Further, the above embodiments have been described with reference to the case where the light source apparatuses according to the embodiments of the present disclosure are each incorporated in a projector, but not necessarily. The light source apparatuses according to the embodiments of the present disclosure may each be used as a lighting apparatus, a headlight of an automobile, and other components.

What is claimed is:

1. A light source apparatus comprising:
   a substrate having a first surface;
   a frame provided at a side facing the first surface;
   a lid with which the frame is provided;
   a light emitter that is accommodated in an accommodation space formed by the substrate, the frame, and the lid and provided at the side facing the first surface of the substrate;
   a wavelength converter that is provided at the substrate, is accommodated in the accommodation space, converts first light emitted from the light emitter into second light having a wavelength different from a wavelength of the first light, and outputs the second light;
   a first optical film that is provided in a light path between the light emitter and the wavelength converter, transmits one of the first light and the second light, and reflects another one of the first light and the second light; and
   an optical element that is provided in the light path between the light emitter and the wavelength converter and has a second surface,
   wherein the light emitter emits the first light in such a way that a chief ray of the first light travels along the first surface, and
   the first optical film is formed at the second surface of the optical element, transmits the first light emitted from the light emitter, and reflects the second light outputted from the wavelength converter.

2. The light source apparatus according to claim 1, wherein the substrate has an inclining surface that inclines toward the lid with respect to the first surface with distance along a traveling direction of the first light, and
   the wavelength converter is provided at the inclining surface.

3. A projector comprising:
   the light source apparatus according to claim 2;
   a light modulator that modulates light outputted from the light source apparatus in accordance with image information; and
   a projection optical apparatus that projects the light modulated by the light modulator.

4. The light source apparatus according to claim 1, wherein a parallelizing element that parallelizes the second light is integrated with the optical element.

5. A projector comprising:
   the light source apparatus according to claim 4;
   a light modulator that modulates light outputted from the light source apparatus in accordance with image information; and
   a projection optical apparatus that projects the light modulated by the light modulator.

6. The light source apparatus according to claim 1, wherein the optical element is provided in a region through which the first light and the second light pass.

7. A projector comprising:
   the light source apparatus according to claim 6;
   a light modulator that modulates light outputted from the light source apparatus in accordance with image information; and
   a projection optical apparatus that projects the light modulated by the light modulator.

8. A projector comprising:
   the light source apparatus according to claim 1;
   a light modulator that modulates light outputted from the light source apparatus in accordance with image information; and
   a projection optical apparatus that projects the light modulated by the light modulator.

9. A light source apparatus comprising:
   a substrate having a first surface;
   a frame provided at a side facing the first surface;
   a lid with which the frame is provided;
   a light emitter that is accommodated in an accommodation space formed by the substrate, the frame, and the lid and provided at the side facing the first surface of the substrate;
   a wavelength converter that is provided at the substrate, is accommodated in the accommodation space, converts first light emitted from the light emitter into second light having a wavelength different from a wavelength of the first light, and outputs the second light;
   a first optical film that is provided in a light path between the light emitter and the wavelength converter, transmits one of the first light and the second light, and reflects another one of the first light and the second light; and
   an optical element that is provided in the light path between the light emitter and the wavelength converter and has a second surface,
   wherein the light emitter emits the first light in such a way that a chief ray of the first light travels along the first surface, and
   the first optical film is formed at the second surface of the optical element, reflects the first light emitted from the light emitter, and transmits the second light outputted from the wavelength converter.

10. The light source apparatus according to claim 9, further comprising a first low-refractive-index layer that is provided between the wavelength converter and the optical element and has a refractive index smaller than refractive indices of the wavelength converter and the optical element.

11. The light source apparatus according to claim 10, further comprising a second optical element that is so disposed on a surface of the lid that is a surface opposite the wavelength converter as to face the wavelength converter via a second low-refractive-index layer having a refractive index smaller than a refractive index of the lid, wherein the second optical element reduces a radiation angle of the second light outputted from the wavelength converter.

12. A projector comprising:

the light source apparatus according to claim 11;

a light modulator that modulates light outputted from the light source apparatus in accordance with image information; and a projection optical apparatus that projects the light modulated by the light modulator.

13. A projector comprising:

the light source apparatus according to claim 10;

a light modulator that modulates light outputted from the light source apparatus in accordance with image information; and a projection optical apparatus that projects the light modulated by the light modulator.

14. The light source apparatus according to claim 9, further comprising a second optical element that is so disposed on a surface of the lid that is a surface opposite the wavelength converter as to face the wavelength converter via a second low-refractive-index layer having a refractive index smaller than a refractive index of the lid, wherein the second optical element reduces a radiation angle of the second light outputted from the wavelength converter.

15. A projector comprising:

the light source apparatus according to claim 14;

a light modulator that modulates light outputted from the light source apparatus in accordance with image information; and a projection optical apparatus that projects the light modulated by the light modulator.

16. The light source apparatus according to claim 9, wherein the optical element is provided in a region through which the first light and the second light pass.

17. A projector comprising:

the light source apparatus according to claim 16;

a light modulator that modulates light outputted from the light source apparatus in accordance with image information; and a projection optical apparatus that projects the light modulated by the light modulator.

18. A projector comprising:

the light source apparatus according to claim 9;

a light modulator that modulates light outputted from the light source apparatus in accordance with image information; and a projection optical apparatus that projects the light modulated by the light modulator.

* * * * *